(12) United States Patent  
Anderson

(10) Patent No.: US 8,308,409 B2
(45) Date of Patent: *Nov. 13, 2012

(54) RAILROAD CAR COIL RESTRAINT SYSTEM

(75) Inventor: John D. Anderson, Oswego, IL (US)

(73) Assignee: Standard Car Truck Company, Park Ridge, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,230

(22) Filed: Sep. 8, 2011

(65) Prior Publication Data

US 2011/0318132 A1    Dec. 29, 2011

Related U.S. Application Data

(60) Division of application No. 12/255,462, filed on Oct. 21, 2008, now Pat. No. 8,033,768, which is a continuation-in-part of application No. 12/098,544, filed on Apr. 7, 2008, now Pat. No. 8,011,865.

(60) Provisional application No. 60/911,436, filed on Apr. 12, 2007.

(51) Int. Cl.
*B60P 7/08* (2006.01)

(52) U.S. Cl. ............ 410/49; 410/47; 410/87; 410/117; 410/155

(58) Field of Classification Search ............... 410/31, 410/32, 36, 39, 40, 42, 47–50, 86–88, 117, 410/118, 154, 155; 105/355, 362; 248/633, 248/687; 206/446, 389, 417, 594, 591, 593, 206/586; 428/167, 188; 114/219; 296/39.1, 296/39.2; 267/140, 141, 145, 153; 108/57.12, 108/901

See application file for complete search history.

(56) References Cited

U.S. PATENT DOCUMENTS 276,017 A    4/1883    Foster
(Continued)

FOREIGN PATENT DOCUMENTS

DE    2330825    9/1975
(Continued)

OTHER PUBLICATIONS

Ameen, Patrick T., "Shifted Coil Steel Loads in Transverse Trough Coil Cars", Dec. 2, 2005, pp. 1-2 (+ attachment).

(Continued)

*Primary Examiner* — Stephen Gordon
(74) *Attorney, Agent, or Firm* — Neal, Gerber & Eisenberg LLP

(57) ABSTRACT

A transverse railroad coil car coil restraint apparatus or system which includes a plurality of coil restraints attachable to each trough in a transverse railroad coil car to reduce the sideways shifting of coils positioned in the troughs. In certain embodiments, the coil restraints are attached in each trough and extend across the transverse coil car. In other embodiments, the coil restraints are attached in each trough along the length of the trough. In certain embodiments, when a coil is positioned in the trough, the coil compresses certain of the coil restraints and does not compress other of the coil restraints which prevents the sideways shifting of the coil during movement of the transverse coil car. In other embodiments, when a coil is positioned in the trough, the coil compresses certain of the compression members and does not compress other of the compression members which prevents the sideways shifting of the coil during movement of the transverse coil car.

22 Claims, 25 Drawing Sheets

U.S. PATENT DOCUMENTS

| | | | |
|---|---|---|---|
| 292,336 A | 1/1884 | Madeira |
| 799,646 A | 9/1905 | Hart |
| 994,822 A | 6/1911 | Daly |
| 1,514,512 A | 9/1924 | Fisher |
| 1,519,901 A | 12/1924 | Boaz et al. |
| 1,777,394 A | 10/1930 | Coe |
| 1,779,484 A | 10/1930 | McWane |
| 2,059,390 A | 11/1936 | Pagel |
| 2,075,711 A | 3/1937 | Gilley |
| 2,144,600 A | 1/1939 | Koonce |
| 2,363,256 A | 11/1944 | Manning et al. |
| 2,383,893 A | 8/1945 | Six |
| 2,491,013 A | 12/1949 | Noll et al. |
| 2,611,495 A | 9/1952 | Weaver |
| 2,620,748 A | 12/1952 | Shields |
| 2,763,380 A | 9/1956 | Danielson |
| 2,838,173 A | 6/1958 | Emery |
| 2,846,959 A | 8/1958 | Perry |
| 2,849,027 A | 8/1958 | Tetyak |
| 2,850,182 A | 9/1958 | Tetyak |
| 2,910,033 A | 10/1959 | Weisburg |
| 3,067,699 A | 12/1962 | Fredriks |
| 3,091,348 A | 5/1963 | Neuhauser |
| 3,098,455 A | 7/1963 | McElroy et al. |
| 3,131,648 A | 5/1964 | Seger |
| 3,145,853 A | 8/1964 | Langengerg |
| 3,174,887 A | 3/1965 | Voelker |
| 3,220,583 A | 11/1965 | Robertson |
| 3,220,681 A | 11/1965 | Erbert |
| 3,229,825 A | 1/1966 | Brown, Jr. |
| 3,247,810 A | 4/1966 | Sepe et al. |
| 3,261,320 A | 7/1966 | Leonard |
| 3,263,830 A | 8/1966 | Anderson |
| 3,275,131 A | 9/1966 | Erickson |
| 3,283,893 A | 11/1966 | Durocher et al. |
| 3,336,069 A | 8/1967 | Bayer et al. |
| 3,385,429 A | 5/1968 | Becker et al. |
| 3,392,682 A | 7/1968 | Francis |
| 3,462,027 A | 8/1969 | Puckhaber |
| 3,476,260 A | 11/1969 | Jay |
| 3,485,347 A | 12/1969 | McGill et al. |
| 3,575,403 A | 4/1971 | Hamel |
| 3,581,674 A | 6/1971 | O'Leary |
| 3,581,929 A | 6/1971 | Guenard et al. |
| 3,590,752 A | 7/1971 | De Pew |
| 3,600,047 A | 8/1971 | MacDonnell |
| 3,612,301 A | 10/1971 | Peacock |
| 3,685,460 A | 8/1972 | Steele, Jr. et al. |
| 3,734,281 A | 5/1973 | Armstrong |
| 3,747,780 A | 7/1973 | Schneider |
| 3,861,110 A | 1/1975 | Bartlett |
| 3,865,358 A | 2/1975 | Butters |
| 3,872,799 A | 3/1975 | Dousset |
| 4,008,669 A | 2/1977 | Sumrell |
| 4,099,617 A | 7/1978 | Nist, Jr. |
| 4,099,626 A | 7/1978 | Magnussen, Jr. |
| 4,102,274 A | 7/1978 | Feary et al. |
| 4,167,211 A | 9/1979 | Haller |
| 4,169,415 A | 10/1979 | Winsor |
| 4,202,520 A | 5/1980 | Loos et al. |
| RE30,373 E | 8/1980 | Nist, Jr. |
| 4,247,237 A | 1/1981 | Brown |
| 4,378,923 A | 4/1983 | Takei |
| 4,384,697 A | 5/1983 | Ruhe |
| 4,506,796 A | 3/1985 | Thompson |
| 4,565,289 A | 1/1986 | Lesueur |
| 4,572,716 A | 2/1986 | West |
| 4,579,304 A | 4/1986 | Williams |
| 4,595,161 A | 6/1986 | Williams |
| 4,610,362 A | 9/1986 | Remp et al. |
| 4,702,311 A | 10/1987 | Bizard |
| 4,706,822 A | 11/1987 | Remp, Jr. et al. |
| 4,832,196 A | 5/1989 | Butler |
| 4,854,792 A | 8/1989 | Cottone |
| 4,946,727 A | 8/1990 | Kessler |
| 5,057,350 A | 10/1991 | Gezels |
| 5,080,314 A | 1/1992 | Moyer et al. |
| 5,123,547 A | 6/1992 | Koch |
| 5,161,703 A | 11/1992 | Patton |
| 5,239,933 A | 8/1993 | Murphy et al. |
| 5,267,648 A | 12/1993 | Baker |
| 5,291,837 A | 3/1994 | Adams, Jr. |
| 5,311,823 A | 5/1994 | Rudibaugh et al. |
| 5,412,858 A | 5/1995 | Brown |
| 5,429,268 A | 7/1995 | Hale et al. |
| 5,433,322 A | 7/1995 | Williams |
| 5,579,697 A | 12/1996 | Burke |
| 5,588,165 A | 12/1996 | Fromme |
| 5,636,951 A | 6/1997 | Long et al. |
| D381,180 S | 7/1997 | Schueneman et al. |
| 5,649,632 A | 7/1997 | Terashima et al. |
| D384,481 S | 9/1997 | Scheckells |
| D385,080 S | 10/1997 | Schueneman et al. |
| 5,701,825 A | 12/1997 | Peach, Jr. |
| D400,441 S | 11/1998 | Warren |
| D403,961 S | 1/1999 | Warren |
| 5,860,627 A | 1/1999 | Edwards |
| D408,737 S | 4/1999 | Warren, Jr. |
| 5,899,331 A | 5/1999 | Warren, Jr. |
| 5,934,467 A | 8/1999 | Gilfert et al. |
| 6,092,970 A | 7/2000 | Hahn et al. |
| 6,209,839 B1 | 4/2001 | O'Malley |
| 6,231,284 B1 | 5/2001 | Kordel |
| 6,261,037 B1 | 7/2001 | Richards et al. |
| 6,302,671 B1 | 10/2001 | Gilfert et al. |
| 6,322,034 B1 | 11/2001 | O'Malley |
| 6,474,613 B2 | 11/2002 | O'Malley |
| 6,553,917 B1 | 4/2003 | Burke et al. |
| 6,561,740 B1 | 5/2003 | Burke et al. |
| 6,997,330 B2 | 2/2006 | Pachao-Morbitzer et al. |
| 7,080,864 B2 | 7/2006 | Casteran |
| 8,011,865 B2 * | 9/2011 | Anderson ........ 410/49 |
| 8,033,768 B2 * | 10/2011 | Anderson ........ 410/49 |

FOREIGN PATENT DOCUMENTS

| DE | 2835219 | 2/1980 |
| SU | 779-129 | 10/1978 |
| SU | 958262 | 9/1982 |

OTHER PUBLICATIONS

Office Action for U.S. Appl. No. 12/098,544 dated Oct. 26, 2010.

* cited by examiner

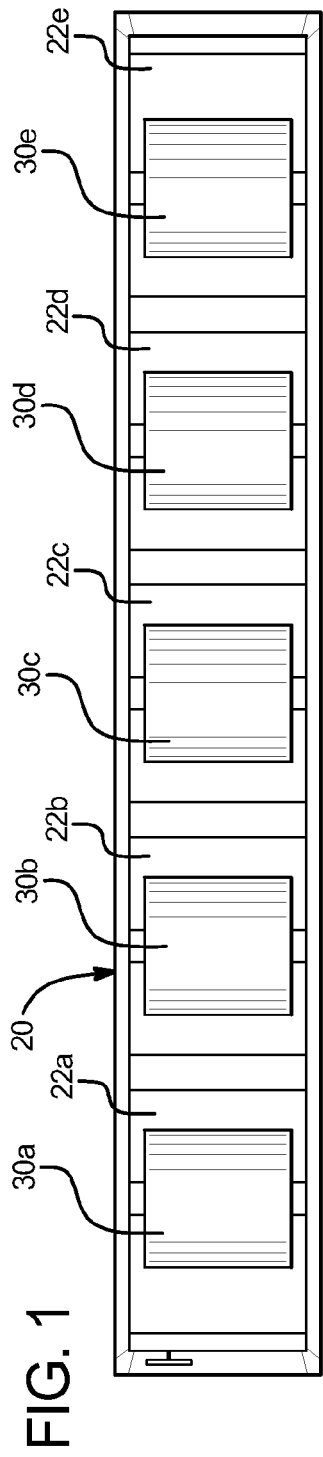
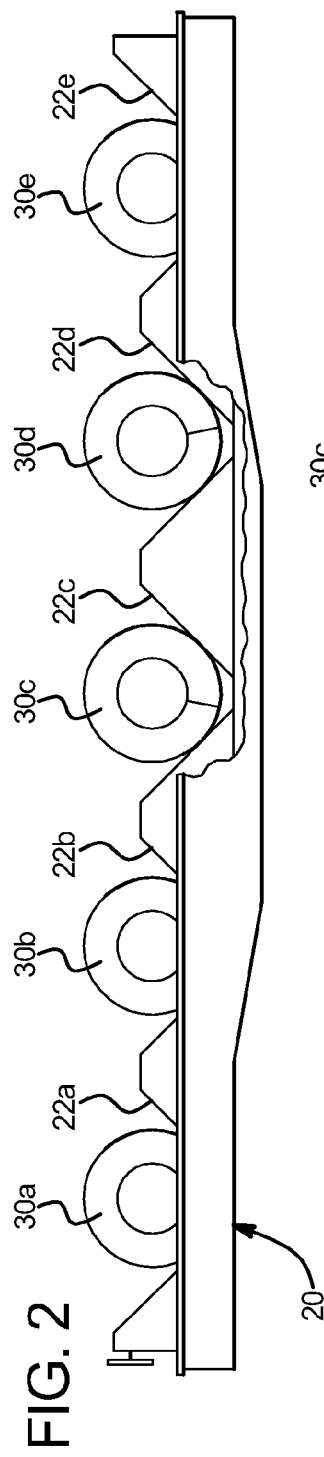
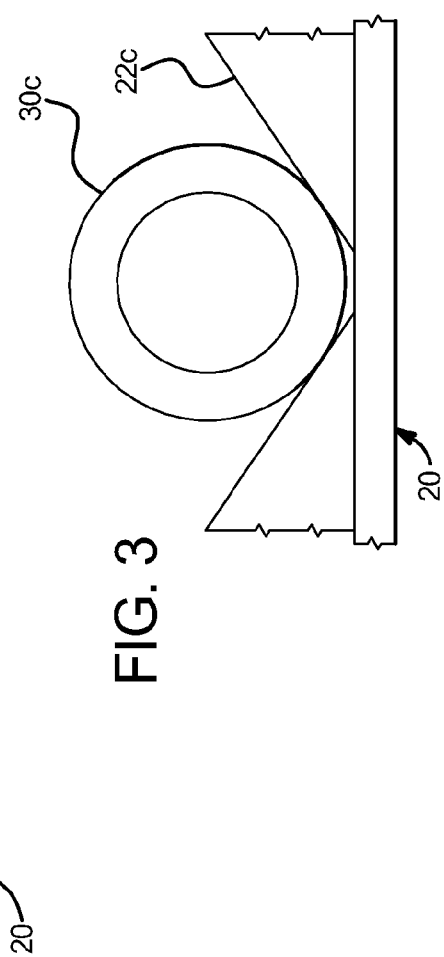

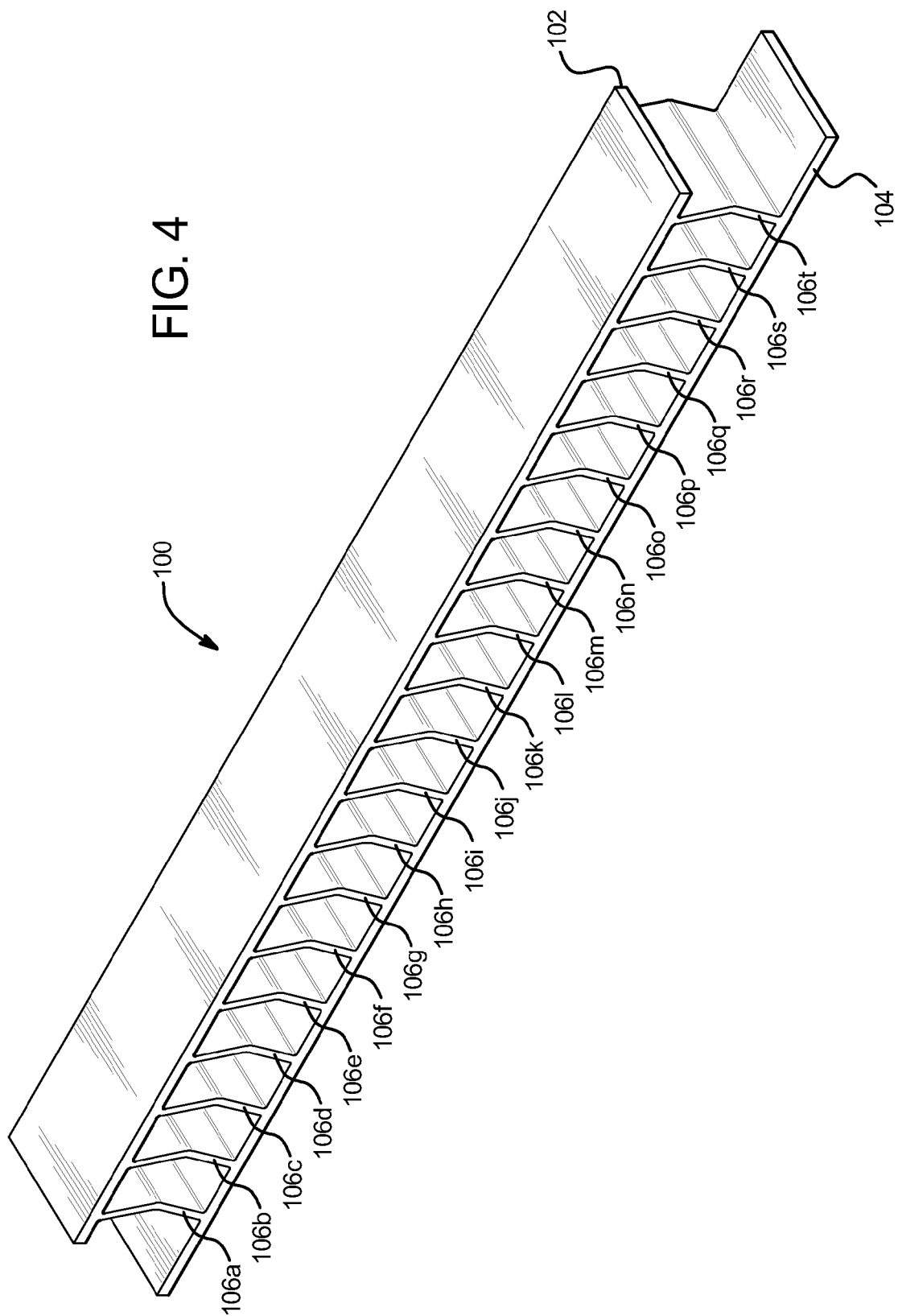

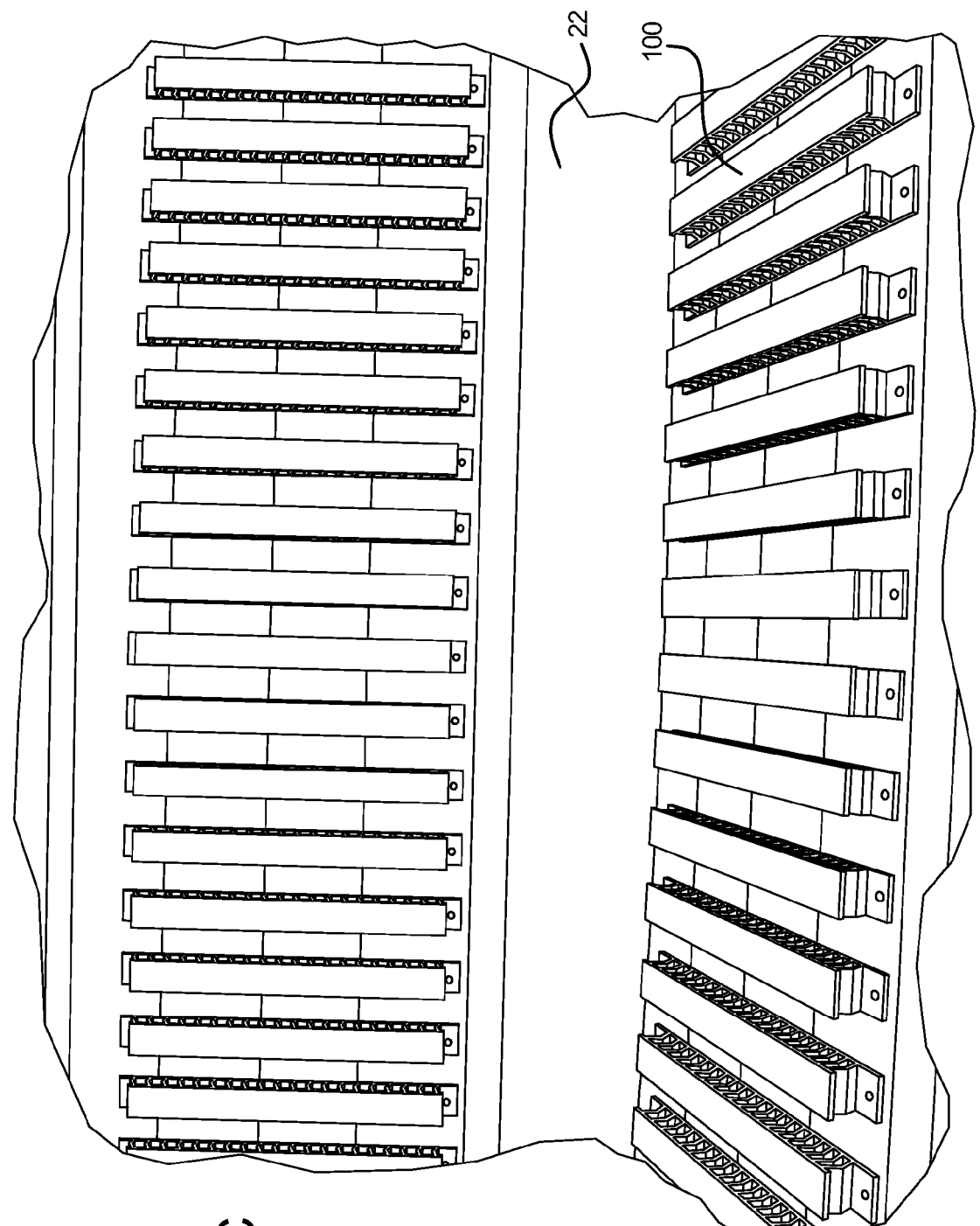

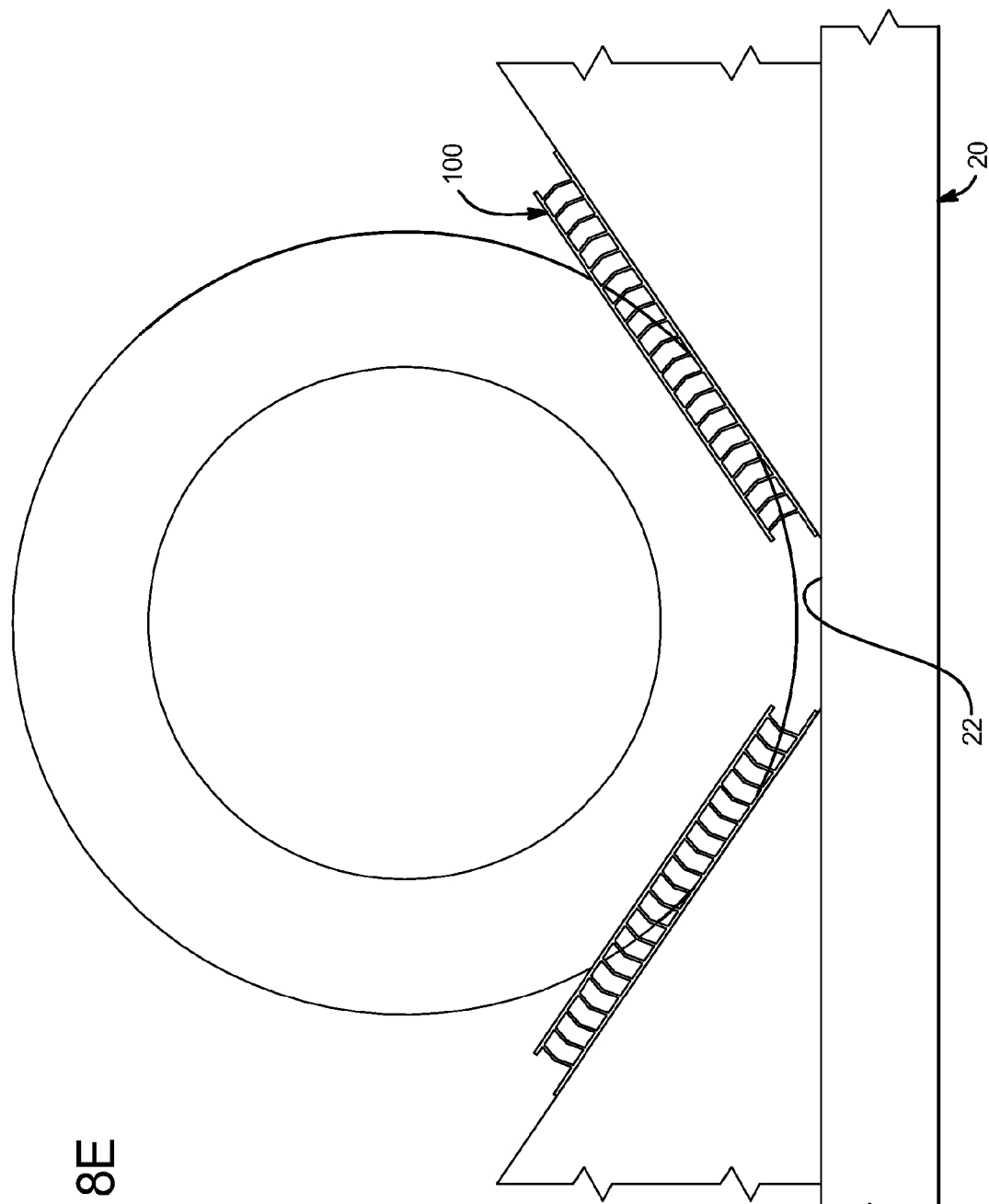

RAILROAD CAR COIL RESTRAINT SYSTEM

PRIORITY CLAIM

This application is a divisional of, claims priority to, and the benefit U.S. patent application Ser. No. 12/255,462, filed Oct. 21, 2008, now U.S. Pat. No. 8,033,768, issued on May 21, 2009, which is a continuation-in-part of, claims priority to, and the benefit U.S. patent application Ser. No. 12/098,544, filed Apr. 7, 2008, now U.S. Pat. No. 8,011,865, issued Oct. 16, 2008, which is a non-provisional of, claims priority to, and the benefit of U.S. Provisional Patent Application Ser. No. 60/911,436, filed Apr. 12, 2007, the entire contents of which are incorporated herein by reference.

BACKGROUND

Railroad cars such as freight railroad cars are used to transport a variety of products. Certain railroad cars are configured to transport relatively large coils such as steel coils. These railroad cars are often referred to in the railroad industry as transverse coil cars. A typical transverse coil car is diagrammatically shown in FIGS. 1, 2, and 3. The typical transverse coil car, generally indicated by numeral 20, includes five longitudinally aligned troughs or compartments 22*a*, 22*b*, 22*c*, 22*d*, and 22*e* which are each configured to respectively hold steel coils 30*a*, 30*b*, 30*c*, 30*d*, and 30*e*. The number of troughs may vary in different transverse coil cars. Each of the troughs extends across or transversely to the length (and direction movement) of the railroad car. The troughs are positioned one after the other along the length of the transverse coil car. Each trough typically has a floor including a bottom wall, a front wall, and a back wall, and spaced-apart side walls or sills. The front and back walls are angled or sloped. Each trough also typically has transversely extending coil supports such as wooden boards (not shown) respectively attached to the front wall and to the back wall. For each trough, the front wall (with the boards) and the back wall (with the boards) of the trough are configured to support a steel coil and prevent the steel coil from moving forward or backward in that trough.

The steel coils are loaded into each of the troughs of a transverse coil car by a suitable crane (not shown). Each of the steel coils are typically wrapped and banded in a conventional manner. The steel coils typically weigh anywhere from approximately 4000 pounds to approximately 60,000 pounds. The steel coils are typically approximately 30 inches to approximately 84 inches wide. Each steel coil is placed in the trough with a portion of its front surface engaging the boards attached to the front wall and with a portion of its back surface engaging the boards attached to the back wall. Different size steel coils engage the boards at different positions. The steel coils may be different based on their width, height or length. When the steel coils are loaded in a transverse coil car, they are preferably respectively centered in the troughs and equally distributed by weight in the troughs of the transverse coil car.

One problem which has arisen with these transverse coil cars is that the steel coils tend to drift or shift from the central positions where they are initially loaded in the respective troughs to one side or another in the respective troughs during movement or travel of the transverse coil cars. One or more of the coils are also sometimes not placed exactly in the central position in the trough which increases the likelihood of this sideways shifting. In some instances, as the trains move along the tracks, the coils develop the frequency of the movement of the train which excites the coils and further increases this sideways movement. Because the steel coils are heavy relative to the transverse coil car, the drifting or shifting of the steel coils in the troughs or compartments to one side of the transverse coil car can cause the transverse coil cars to become inappropriately weighted or lopsided and in certain instances to tip over and derail the freight train. A derailed train can cause extensive damage and injury, is disruptive, and is expensive and time consuming to remedy.

One proposed solution to this problem has been to use wooden blocks to brace the bottoms of the steel coils to prevent them from moving sideways. More specifically, after a steel coil is positioned in the trough, wooden blocks are cut to size and are secured to the deck (such as the wooden boards) of the trough adjacent to each side of the steel coil to prevent the steel coil from moving sideways in the trough. This is an extremely labor intensive, time-consuming and expensive process. Additionally, after the steel coil is removed, the blocks and the securing devices used to secure the blocks become waste or unwanted dunnage. These blocks often cannot be reused because different size steel coils are placed in the troughs. Additionally, the blocks often cannot be reused because, even if the steel coil is of the same size as the previous steel coil placed in the trough, it is not positioned in the trough in exactly the same place as the previous steel coil. Thus, different size blocks must be used to prevent the shifting of the steel coil and the previous blocks become useless.

Another problem with blocking the steel coils in this manner is that people must enter the troughs to place the blocking in the troughs and to remove the blocking. These people can get hurt during these processes (especially since the front and back walls of the toughs are sloped). Railroads desire to avoid having people enter the troughs at all to avoid injuries.

Another proposed solution has been to place flat rubber mats in the troughs attached to the boards of the front and back walls to provide additional frictional engagement with the steel coils. Another similar proposed solution has been to place conveyor belts or conveyor belt material in the trough to increase the frictional engagement with the steel coil. These solutions have not solved the problem. Another proposed solution has been to angle or taper the side walls of the trough. This proposed solution has not been employed and is unlikely to work.

Accordingly, there is a need for a relatively inexpensive, easy to install and an easily operable apparatus for preventing the transverse shifting of different size and differently positioned coils in the troughs of transverse coil cars. There is also a need for such an apparatus that is reusable and that does not waste materials.

SUMMARY

The present disclosure relates in general to a railroad car coil restraint system, and in particular to a transverse railroad coil car restraint system for restraining sideways shifting of coils (such as steel coils, aluminum coils, and paper coils) in the troughs of transverse railroad coil cars. These coils are sometimes called canned goods in the industry. The present disclosure solves the above problems relating to canned goods by providing a transverse railroad coil car coil restraint apparatus or system which includes a plurality of coil restraints attachable to or in each trough in a transverse railroad coil car to reduce the sideways drifting or shifting of coils respectively positioned in the troughs. The coil restraints are also reusable and do not waste materials. The coil restraints are relatively inexpensive, easy to install, can be permanently installed, and operate automatically each time a coil is placed in a trough, regardless of the size of the coil and the position of the coil in the trough. The coil restraints are configured to engage sufficient portions of the sides of different size and differently positioned coils in the troughs of transverse coil cars to prevent the sideways shifting of the coils. The coil restraint system of the present disclosure can be employed to restrain any coils or canned goods in the troughs and are specifically suited for restraining heavy steel coils in the troughs. The present disclosure is primarily discussed with respect to steel coils; however, it should be appreciated that the present disclosure is not limited to steel coils. The coil restraint system of the present disclosure can also be employed for retaining the coils or other cylindrical objects in railroad cars as well as in other forms of transportation, and in other containers.

In certain embodiments, the coil restraints of the present disclosure are suitably attached to the existing wooden boards (described above) of each trough of the transverse coil car. These coil restraints operate automatically regardless of the size of the steel coil or the position of the steel coil in the trough. In other embodiments, certain of the boards (described above) of each trough of the transverse coil car are removed and replaced with modified boards having the coils restraints of the present disclosure attached thereto or mounted therein or thereto. These alternative coil restraints also operate automatically regardless of the size of the coil or the position of the coil in the trough. In other embodiments, the wooden boards are removed and the coil restraints are attached to the underlying walls of the trough.

In certain embodiments, the coil restraints of the coil restraint system are each attached in each trough along the length of the trough (i.e., extending from front to back), and specifically to the front and back walls of the trough. In other embodiments, the coil restraints of the present disclosure are attached in each trough and extend transversely or across the trough. In either embodiment, the coil restraints are preferably spaced apart (from side to side) from each other at desired distances to account for different size and different positioned coils. In other embodiments, the coil restraints are spaced apart from front to back.

More specifically, in one embodiment, each coil restraint of the coil restraint system includes an elongated top or coil engaging wall, an elongated base, bottom or mounting wall, and a plurality of independently flexible or crushable supports or compression members connected to and extending between the top and base walls. A plurality of these coil restraints are attached to the boards of the front and/or back walls at spaced apart positions in relation to each other and extend lengthwise (i.e., along the direction of movement of the railroad car) in each trough. When a coil is positioned in the trough, the coil engages the top walls of and compresses certain of the coil restraints (i.e., compresses the flexible compression members of certain of the coil restraints underneath the coil) and does not compress other of the coil restraints (i.e., does not compress other of the flexible compression members not underneath the coil). The non-compressed upstanding coil restraints directly adjacent to each side of the steel coil are configured to sufficiently engage the sides of the coil to prevent the sideways shifting of the coil during movement of the transverse coil car.

In another embodiment, each coil restraint includes a top wall and a plurality of independently biased compression members respectively extending through apertures in the top wall. A plurality of these coil restraints are attached to the boards in the trough in spaced-apart relation to each other. In one such embodiment, these coil restraints are positioned transverse to or across the troughs in the transverse coil car. When a coil is positioned in the trough, the coil compresses certain of the compression members (i.e., the ones underneath the coil) and does not compress other of the compression members (i.e., the ones not underneath the coil) of one or more of these coil restraints. The non-compressed compression members directly adjacent to each side of the coil are configured to sufficiently engage each of the sides of the coil to prevent the sideways shifting of the coil during movement of the transverse coil car.

In a further embodiment, each coil restraint of the coil restraint system includes an elongated top or coil engaging wall, an elongated base, bottom or mounting wall, and a plurality of independently flexible or crushable supports or compression members connected to and extending between the top and base walls. These coil restraints are configured to extend transversely (i.e., from side to side) along each of the front and back walls. When a coil is positioned in the trough, the coil engages the top walls of and compresses certain of these coil restraints (i.e., compresses the flexible compression members of certain of the coil restraints underneath the coil) and does not compress other of the coil restraints (i.e., does not compress other of the flexible compression members not underneath the coil). The top walls of the noncompressed areas of these coil restraints are configured to sufficiently engage the sides of the coil to prevent the sideways shifting of the coil during movement of the transverse coil car.

Additional features and advantages are described herein, and will be apparent from, the following Detailed Description and the figures.

BRIEF DESCRIPTION OF THE FIGURES

FIG. 1 is a diagrammatic top view of a transverse coil railroad car having a plurality of troughs for transporting steel coils.

FIG. 2 is a diagrammatic side view of a transverse coil railroad car having a plurality of troughs for transporting steel coils, and having one of the side walls broken away to show two of the coils sitting in two of the adjacent troughs.

FIG. 3 is a somewhat enlarged diagrammatic fragmentary side view of a trough of a transverse coil railroad car and a steel coil sitting in the trough.

FIG. 4 is a perspective view of a coil restraint of a coil restraint system of one embodiment of the present disclosure, and illustrating the compression members all in extended or non-compressed positions.

FIGS. 8A, 8B, 8C, and 8D are different perspective views of a plurality of the coil restraints of FIG. 4 positioned in a trough of a transverse railroad car prior to a steel coil being positioned in the trough.

FIG. 8E is an enlarged diagrammatic fragmentary side view of a trough of a transverse coil railroad car and a coil sitting in the trough, and non-compressed coil restraints of FIG. 4 adjacent to the sides of the coil in the trough.

DETAILED DESCRIPTION

Figure 5:
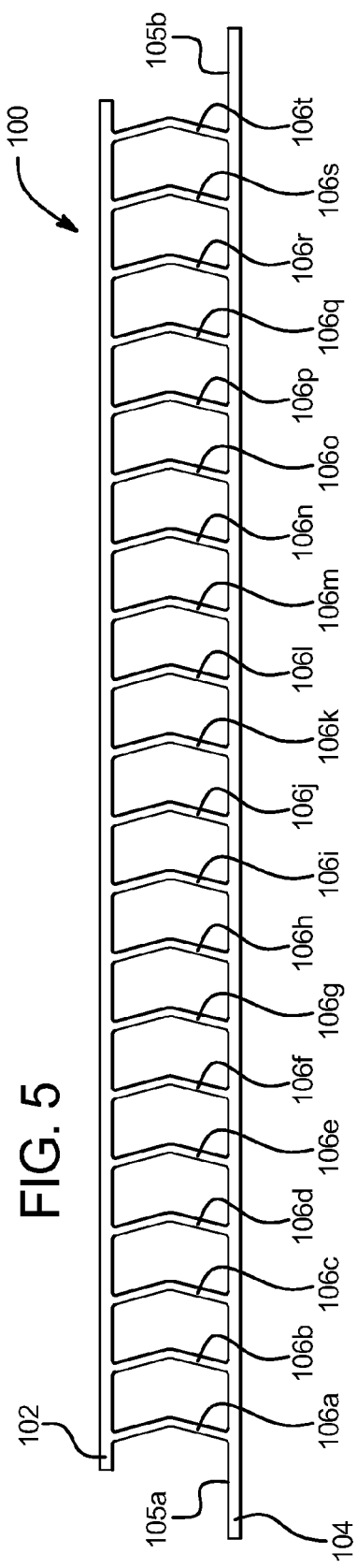
FIG. 5 is a side view of the coil restraint of FIG. 4.
Figure 6:
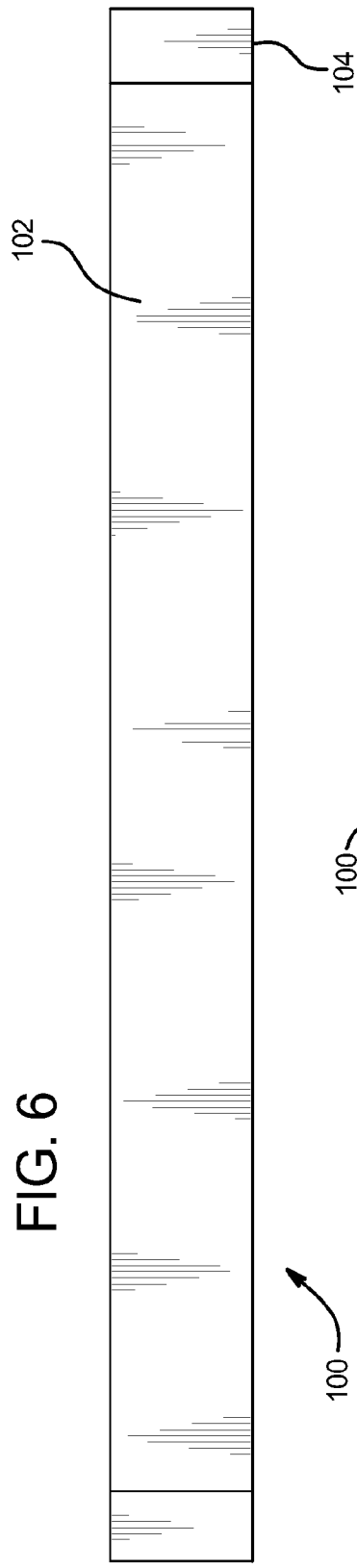
FIG. 6 is a top view of the coil restraint of FIG. 4.
Figure 7:
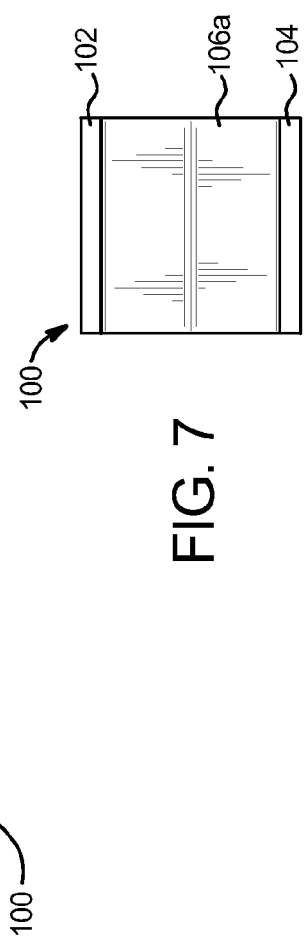
FIG. 7 is an end view of the coil restraint of FIG. 4.

Referring now to FIGS. 4 to 7, one embodiment of the coil restraint of one coil restraint system of the present disclosure is illustrated and generally indicated by numeral 100. The coil restraint 100 includes an elongated top or coil engaging wall 102, an elongated bottom or mounting wall 104, and a plurality of independently compensable, depressible, flexible or crushable compression members or walls 106a to 106t integrally attached to and extending between the top wall 102 and the bottom wall 104. In the illustrated embodiment, each of the compression members 106a to 106t is formed with a crease to facilitate compression of that member when the steel coil engages the top wall 102 of that coil restraint 100. It should be appreciated that the compression members could be otherwise suitably configured for compression. The coil restraint 100 may be made from any suitable rubber, plastic or composite material. Such materials include, for example a suitable EPDM rubber, a suitable blended SBR rubber, any other suitable rubber or plastic such as a urethane, or injection molded TPR, TPE or TPU. The suitable material will provide the appropriate resiliency and flexibility. Depending on the length and material, each coil restraint of the various embodiments disclosed herein may be compression molded or extruded.

In one embodiment, the coil restraint (when not compressed) is approximately 2 inches high, although it should be appreciated that the height may vary. In one embodiment, the top, bottom and compression walls are made in a desired length and cut into individual coil restraints of desired widths. It should be appreciated that each coil restraint may be of any suitable length as further discussed below, and that multiple coil restraints may be employed in a line. The coil restraint 100 may be made in any suitable lengths and sizes. The coil restraints may be made in any other suitable manner.

It should be appreciated that the coil restraints 100 in this embodiment may be respectively mounted onto the front and back walls in any suitable manner. In one embodiment, each end of the bottom wall is formed or made with a suitable aperture (not shown) which facilitates attachment of the coil restraint to the boards of the front and back walls of the trough and specifically to the wooden boards in the trough. For example, self-tapping screws or bolts can be employed to secure the coil restraints. In the illustrated embodiment, the bottom wall 104 is longer than the top wall 102 to facilitate easy access to the apertures (not shown) for attachment to the boards. More specifically, the bottom wall 104 includes two mounting members, sections or flaps 105a and 105b (see FIG. 5) for mounting the coil restraint to the front or back wall. In another embodiment, the boards are eliminated and the coil restraints are bonded or otherwise suitably attached to suitable plates (such as steel plates) attached to the front or back walls of the trough, or suitable plates which form the front and back walls of the trough.

In a further embodiment, a plurality of retainer bars or members (not shown in FIGS. 4 to 7) are used to secure the coil restraints in the troughs. In one such embodiment, a first retainer member is placed over the lower portions of the bottom walls of a plurality of aligned coil restraints on one the front or back walls of the trough and a second retainer is placed over the upper portions of the bottom walls of those plurality of restraints. The first and second retainers are each suitably secured to the wall of the trough and thus hold the coil restraints in place. Thus, in this embodiment, the coil restraint system includes a plurality of coil restraints and the retainers. It should be appreciated that the retainers can be made of any suitable material. It should also be appreciated that the retainers can be covered or coated with a suitable material such as rubber to minimize potential damage to the coils. It should also be appreciated that this type of coil restraint securing apparatus limits the likelihood of the bottom walls tearing. It should further be appreciated that the size, shape and materials of the retainers can vary.

FIGS. 8A, 8B, 8C, and 8D generally show a plurality of coil restraints 100 mounted in a trough 22 of a transverse coil car 20 and how each of the coil restraints which are part of a coil restraint system work together to secure a coil in a trough.

Figure 8A:
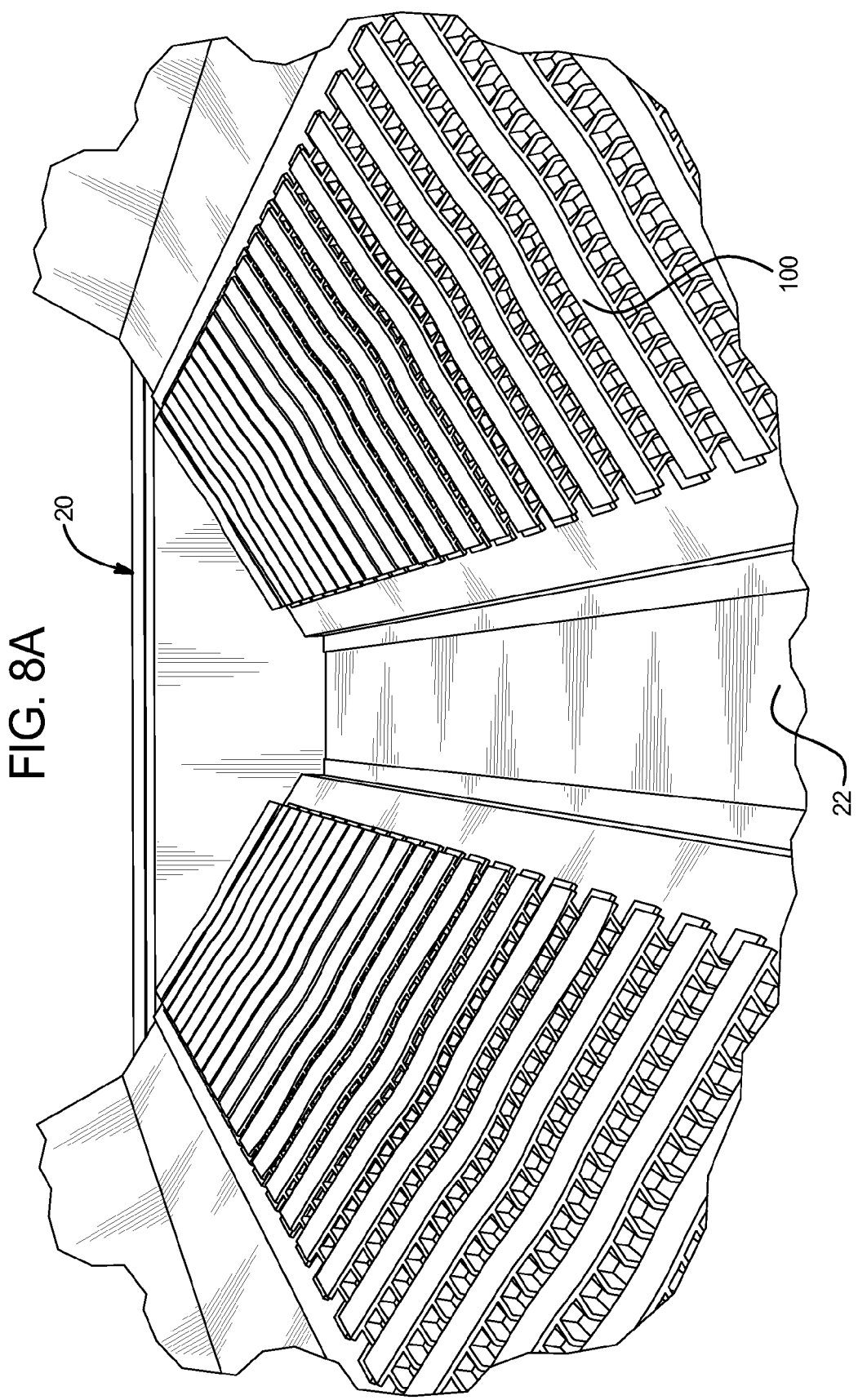
Figure 8B:
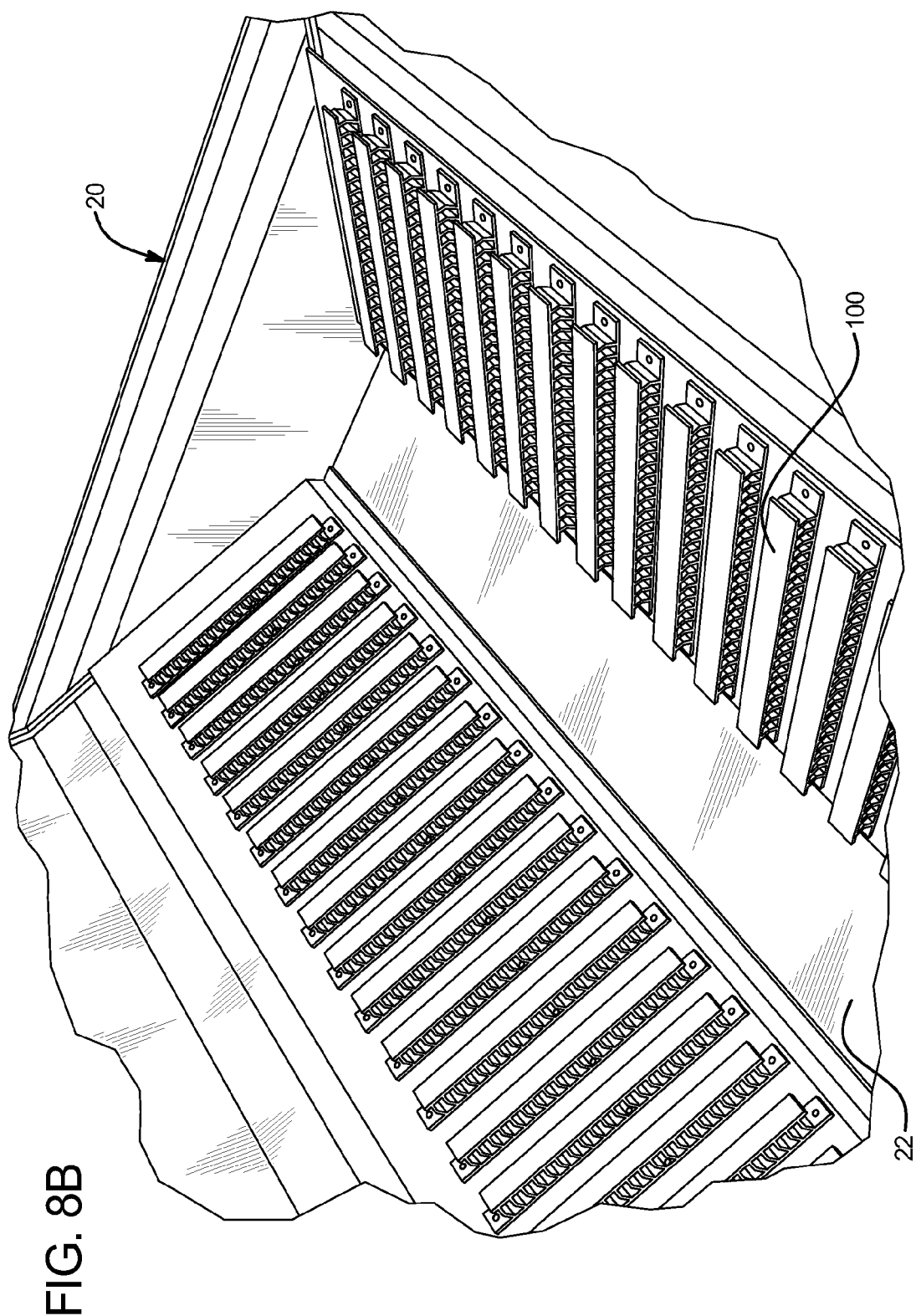
Figure 8D:
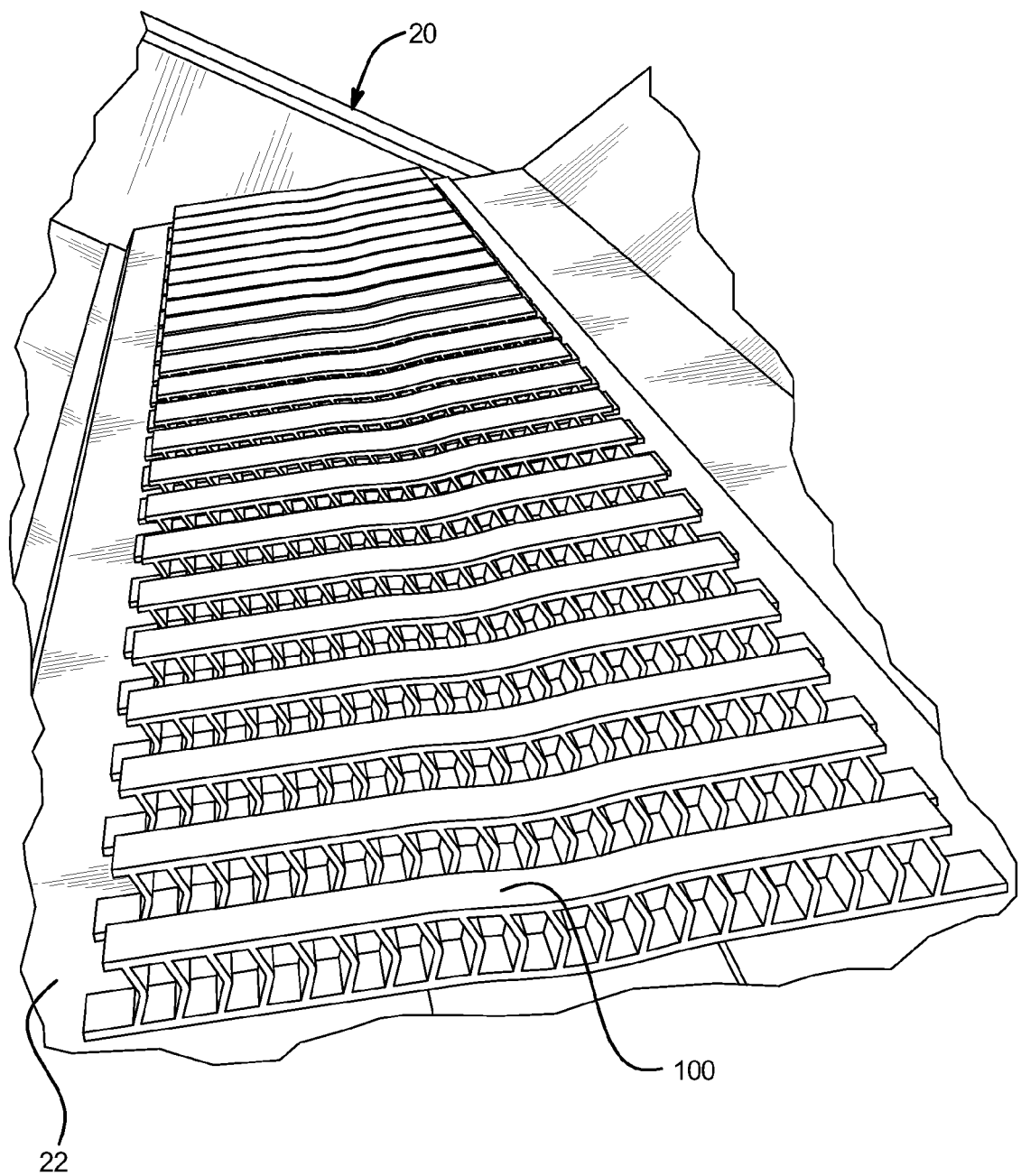

The coil restraints 100 of the coil restraint system are mounted along the length of the trough. The coil restraints are spaced apart approximately every 2 inches in this illustrated embodiment of the coil restraint system. It should be appreciated that the coil restraints may be placed at any suitable distances from each other based at least in part on the coils the railroad car will carry. Suitable fasteners (not shown in FIGS. 8A, 8B, 8C, and 8D) are used to attach the ends of each coil restraint to the boards of the trough. FIGS. 8A, 8B, 8C, and 8D shows all of the coil restraints in extended or non-compressed positions because no coil is positioned in the trough 22. It should be appreciated that FIG. 8A shows that the coil restraints regain their entire or substantially entire original shape after the coil is removed. When a steel coil is positioned in the trough 22, certain of the coil restraints of the coil restraint system on both the front and back walls of the trough will be compressed by the steel coil and certain of the coil restraints on either side of the steel coil will not be compressed. When the steel coil is in the trough 22, the non-compressed coil restraints directly adjacent to the respective sides of the steel coil as generally illustrated in FIG. 8E are configured to engage the sides of the steel coil to prevent the sideways shifting of the steel coil in the trough. It should be appreciated that while the coil restraints are shown attached to both of the front and back walls of the trough, that the coil restraints may alternatively be attached to only one of these walls. It should also be appreciated that the coil restraints may be spaced differently than shown on each or both of the front and back walls.

It should be appreciated that for steel coils of different sizes (and practically different widths), the different size steel coils will compress different ones of the coil restraints and the coil restraints that are not compressed and adjacent to the sides of the steel coil will be the coil restraints that prevent sideways shifting of the steel coils. It should also be appreciated that for steel coils placed in different locations in the trough, the steel coils will compress different ones of the coil restraints of the coil restraint system, and the coil restraints that are not compressed and adjacent to the sides of the steel coil will be the coil restraints that prevent sideways shifting of the steel coils. It should thus be appreciated that the coil restraint system of the embodiment illustrated in FIGS. 4 to 8E is configured to engage the sides of different size and differently positioned coils in the troughs of transverse coil cars to prevent the sideways shifting of the steel coils.

Figure 9:
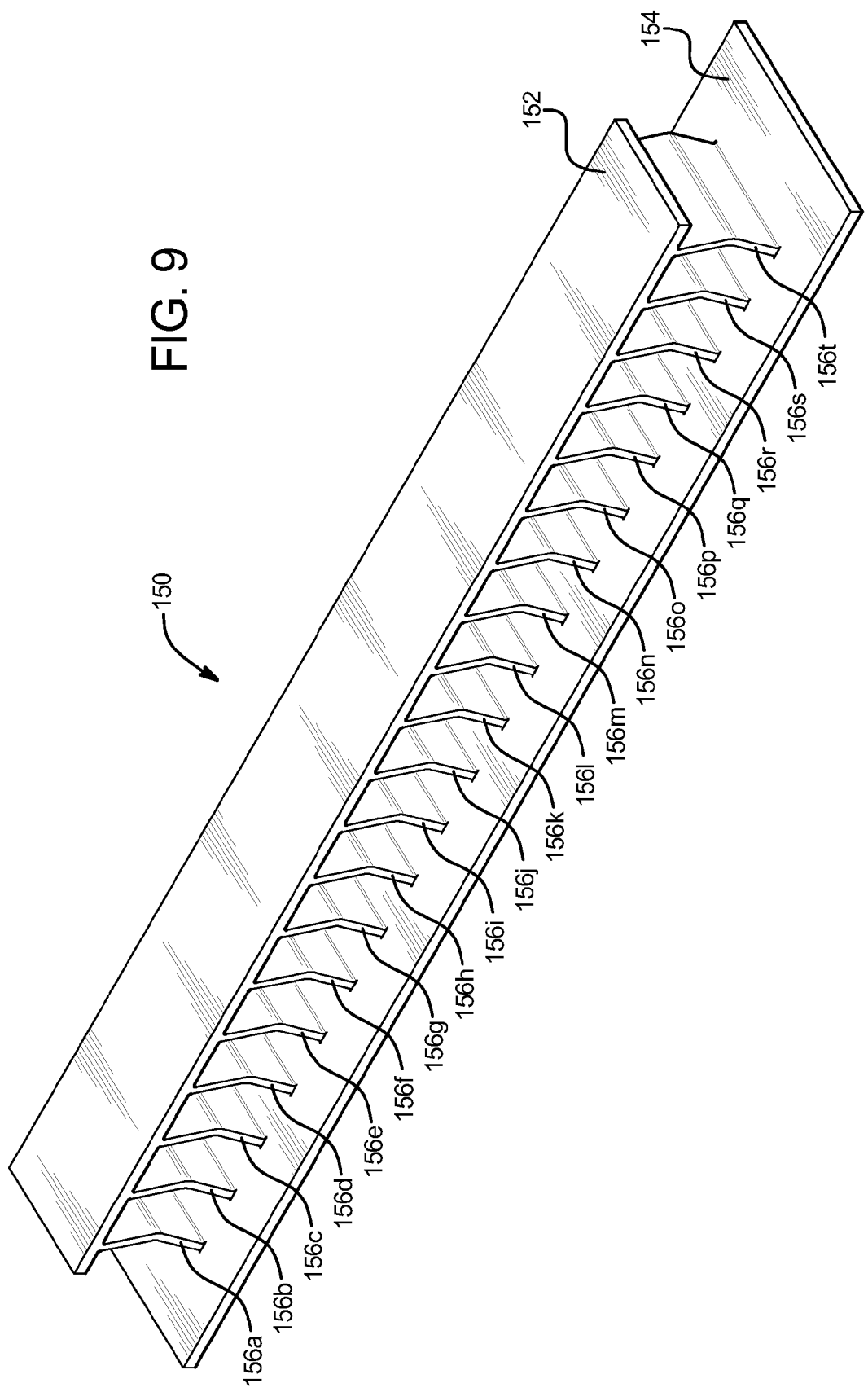
FIG. 9 is a perspective view of a coil restraint of a coil restraint system of another embodiment of the present disclosure.

FIG. 9 illustrates a coil restraint of the coil restraint system of an alternative embodiment of the present disclosure, which is generally indicated by numeral 150. The coil restraint 150 includes an elongated top wall 152, an elongated bottom wall 154, and a plurality of independently flexible or crushable compression members or walls 156a to 156t integrally attached to and extending between the top wall 152 and the bottom wall 154. In this embodiment, the bottom wall 154 is longer than the top wall to facilitate attachment of the coil restraints to the trough as indicated above. In this embodiment, the bottom wall 154 is also wider than the top wall 152 to facilitate attachment of the coil restraints to the trough. More specifically, the respective bottom walls of the multiple coil restraints of this embodiment are placed abutting or directly adjacent to each other so that the installer does not have to worry about spacing apart or measuring the spacing of the coil restraints. For example, in this embodiment, the installer can attach a coil restraint at the center of one of the walls of the trough and install the rest of the coil restraints each butting up against a previously installed coil restraint (i.e., toward each side wall). This wider and longer size of the bottom wall (which forms outwardly extending lips) also facilitates easier installation with an air powered screw gun or other suitable device.

It should thus be appreciated that size, shape and configuration of this coil restraint of the coil restraint system and it components may vary in accordance with the present disclosure. It should also be appreciated that the number of compression members may vary. It should also be appreciated that multiple compression members may be configured to function together rather than independently.

Figure 10:
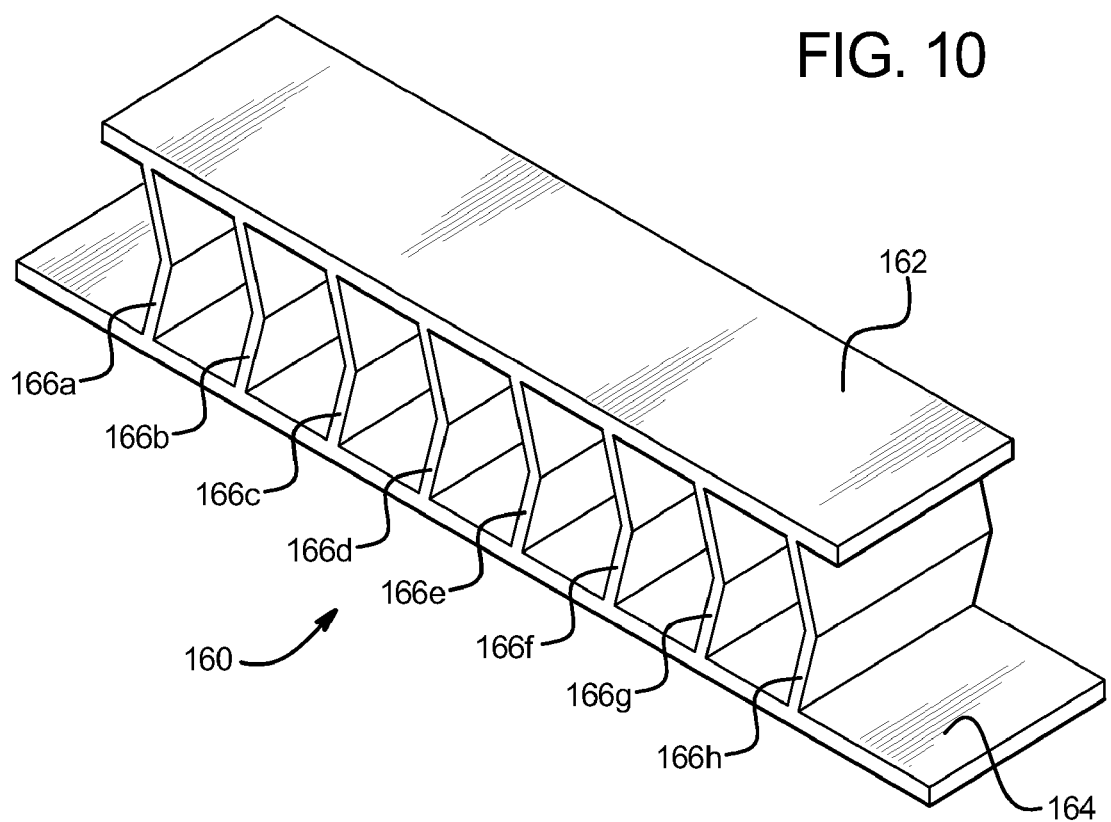
FIG. 10 is a perspective view of a coil restraint of a coil restraint system of another embodiment the present disclosure.
Figure 11:
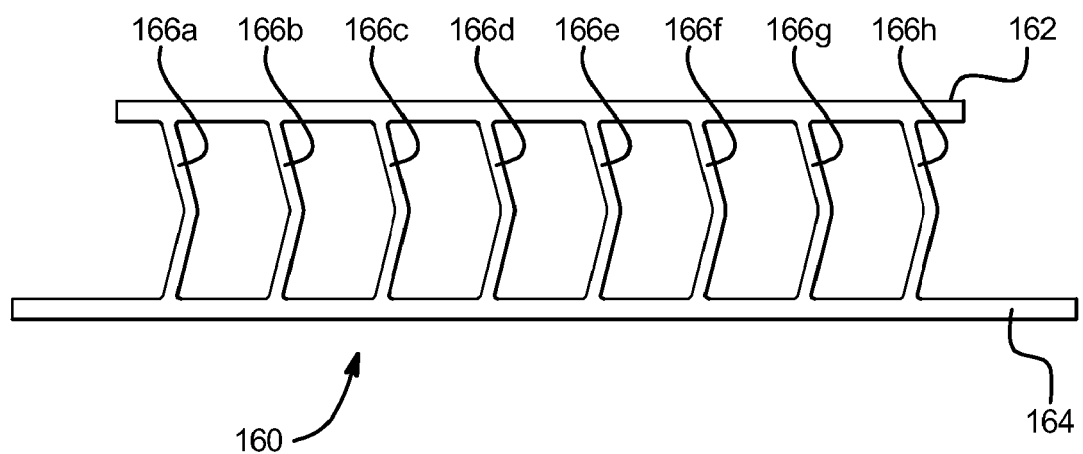
FIG. 11 is a side view of the coil restraint of FIG. 10.
Figure 12:
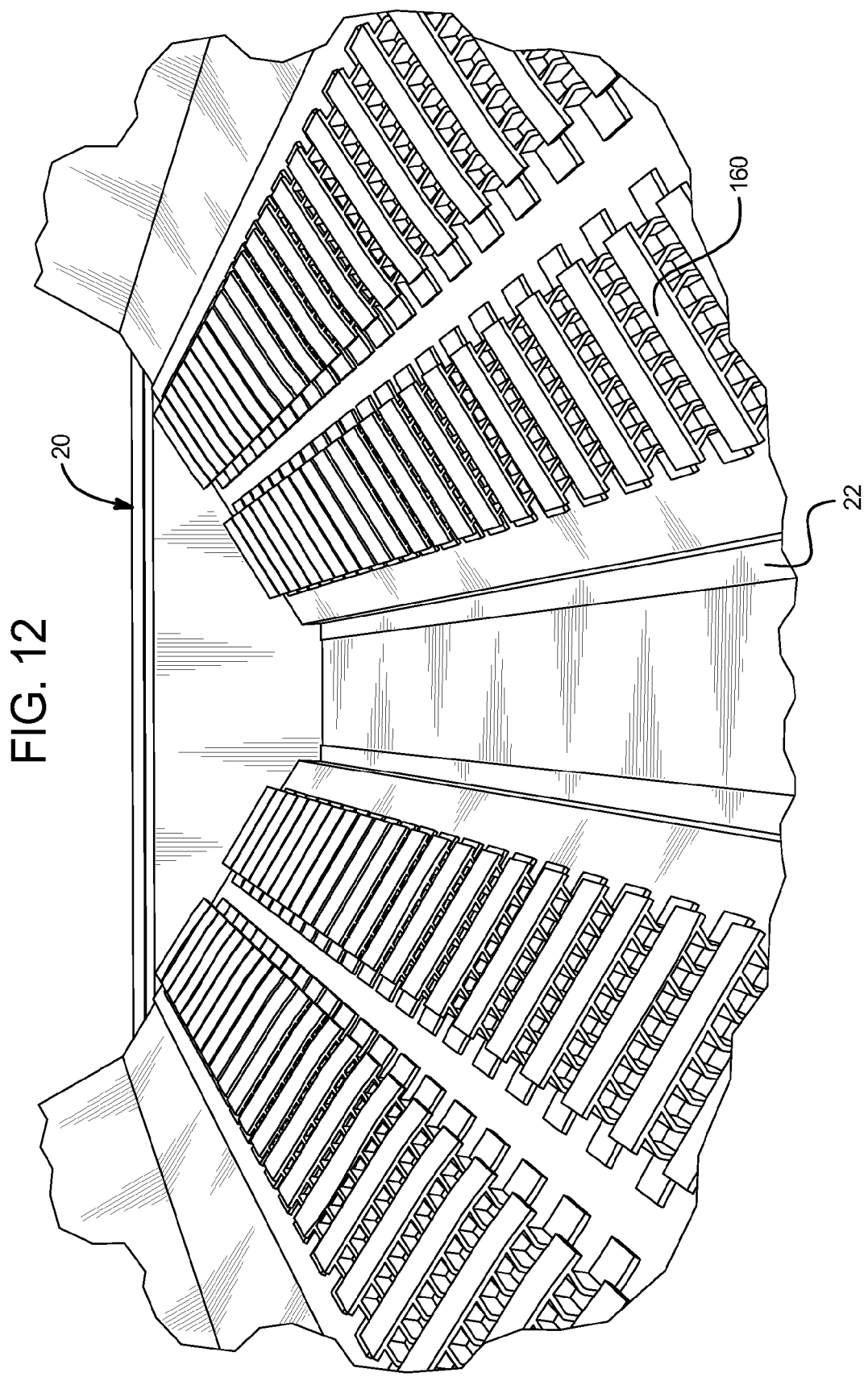
FIG. 12 is a perspective view of a plurality of the coil restraints of FIG. 10 positioned in a trough of a transverse railroad car prior to a coil being positioned in the trough.

FIGS. 10 and 11 illustrate a shorter version of the coil restraint of FIGS. 4 to 7 of the coil restraint system of the present disclosure. This shorter version is generally indicated by numeral 160. The coil restraint 160 includes an elongated top wall 162, an elongated bottom wall 164, and a plurality of independently flexible or crushable compression members or walls 166a to 166h integrally attached to and extending between the top wall 162 and the bottom wall 164. In this embodiment, the bottom wall 164 is longer than the top wall 162 to facilitate attachment of the coil restraints to the trough as described above. This shorter embodiment is approximately 10 inches long (as opposed to the 20 inch length of the coil restraint 100 of FIGS. 4 to 8E). This shorter length allows the coil restraint to be easily extruded instead of being compression molded. This reduces the overall cost of manufacture. It should be appreciated that this shorter embodiment can be attached or aligned in pairs to create the same functionality in the trough as one of the longer coil restraints described above. FIG. 12 illustrates a plurality of the coil restraints 160 positioned in a trough 22 of a transverse railroad car 20 prior to a steel coil being positioned in the trough. This shows multiple pairs of aligned coil restraints 160 respectively replacing the longer coil restraints of the embodiments of FIGS. 4 to 8E. It should be appreciated that the coils restraints of each respectively aligned pair of coil restraints 160 can be positioned closer to each other than as shown in FIG. 12.

Figure 13:
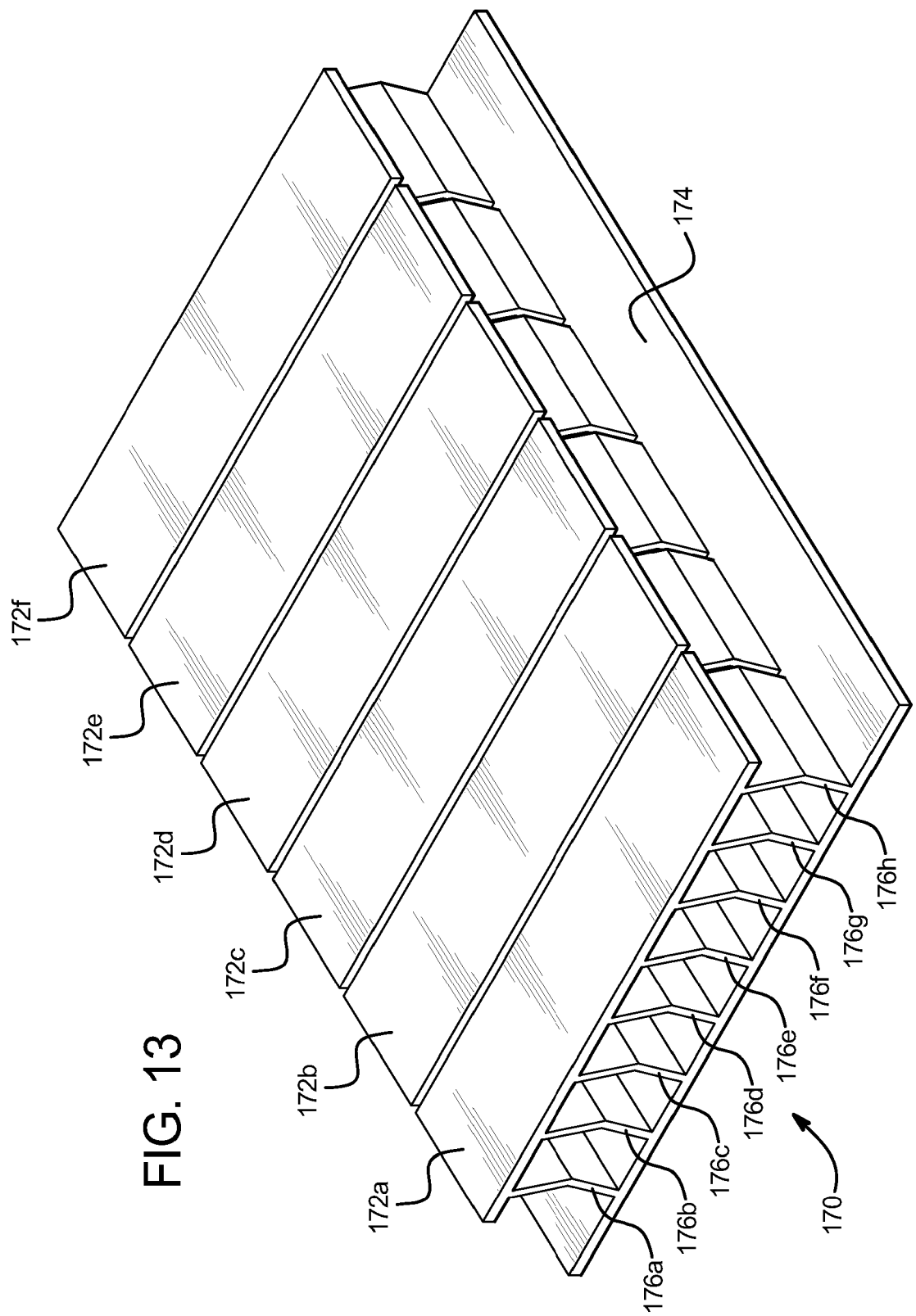
FIG. 13 is a perspective view of a coil restraint of a coil restraint system of another embodiment of the present disclosure.
Figure 14:
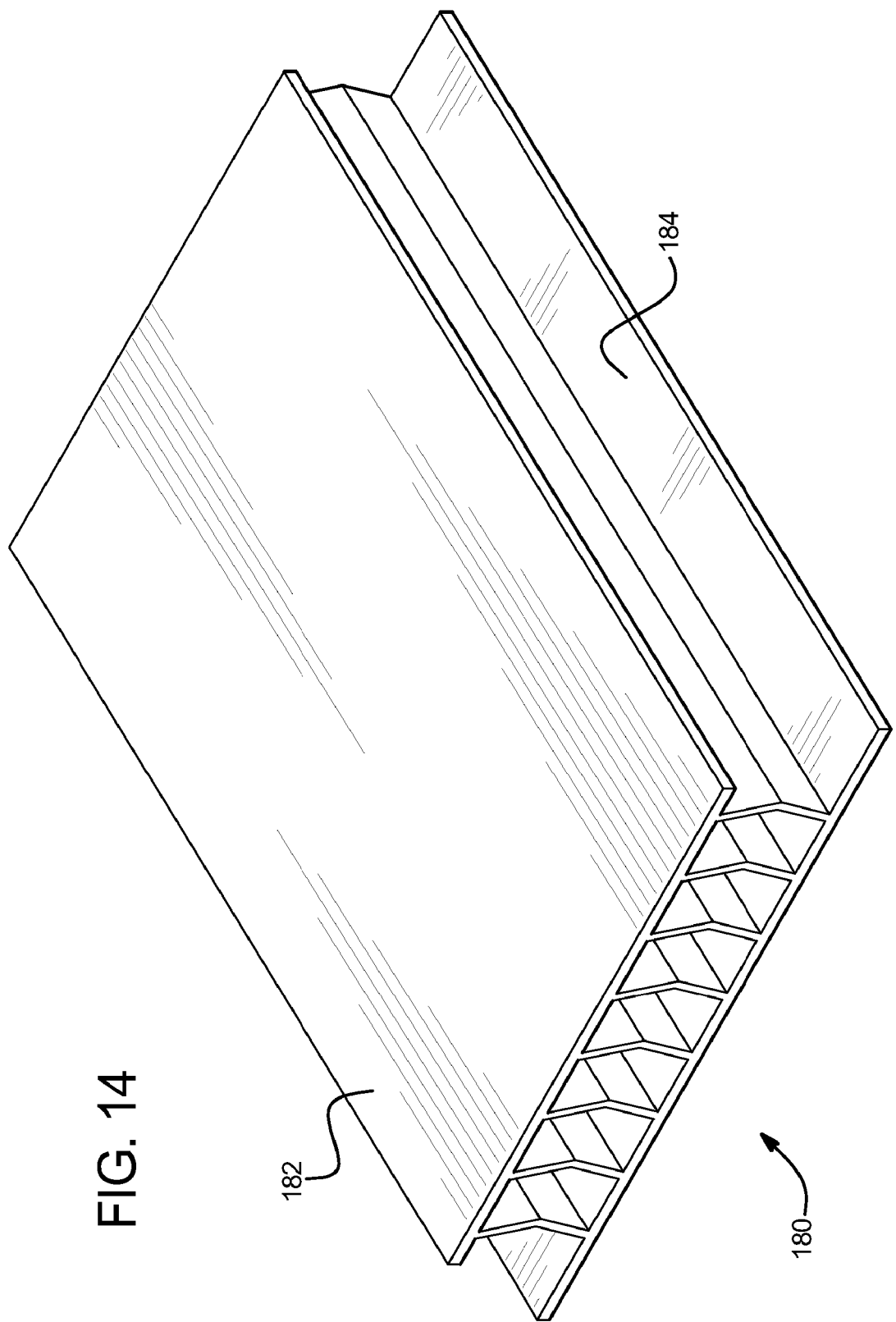
FIG. 14 is a perspective view of a coil restraint of a coil restraint system of another embodiment of the present disclosure.

FIG. 13 illustrates the coil restraint of an alternative embodiment of the coil restraint system of the present disclosure, generally indicated by numeral 170. The coil restraint 170 includes a plurality of elongated top walls 172a, 172b, 172c, 172d, 172e, and 172f, an elongated bottom wall 174, and a plurality of sets of independently flexible or crushable compression members or walls 176a to 176h integrally attached to and extending respectively between the top walls 172a, 172b, 172c, 172d, 172e, and 172f, and the bottom wall 174. In this embodiment, the bottom wall 174 is longer than each of the top walls 172a, 172b, 172c, 172d, 172e, and 172f to facilitate attachment of the coil restraint to the trough as described above. This embodiment is approximately 10 inches long which enables the coil restraint to be easily extruded. In one embodiment, this coil restraint is extruded with the top wall as a single wall and with the compression members from each top wall to the bottom wall connected. This construction is generally illustrated in FIG. 14. The top wall and compression members are then cut to form the separate or individual top walls and compression members. It should be appreciated that the bottom wall 174 is not cut after the extrusion process to manufacture the embodiment of FIG. 13. It should further be appreciated that the bottom wall 174 can be cut after the extrusion process to make the embodiment of FIG. 10. These various embodiments illustrate various methods of reducing the overall cost of manufacture of various embodiments of the coil restraint system of the present disclosure.

As further discussed below in relation to FIGS. 24, 25, and 26, it should also be appreciated that it is possible to use the embodiment of FIG. 14, generally indicated by numeral 180 as the coil restraint of the present disclosure (i.e., without cutting the top wall 182 and compression members). In this embodiment, the heavy coil would compress part of the top wall and the compression members under that part of the top wall. The non-compressed portions of the top wall and non-compressed compression members thereunder would co-act to engage the side of the coil to prevent sideways movement of the coil.

It should thus be appreciated that the sizes, shapes and configuration of the coil restraints may vary in accordance with the present disclosure. It should be appreciated that the sizes and shapes of the compression members may vary in accordance with the present disclosure. It should be appreciated that a support plate (not shown) may be employed to support the coil restraints. In such embodiments, the bottom walls are suitably attached to the support plates.

FIGS. 15 to 20 illustrate a substantially varied alternative embodiment of a coil restraint of an alternative coil restraint system of the present disclosure, and which is generally indicated by numeral 200. This coil restraint is configured to operate with similar coil restraints in a coil restraint system. In one embodiment, the coil restraint 200 includes a top wall 202 which defines a plurality of spaced-apart apertures, a bottom wall 204, and a plurality of compression assemblies 206a to 206s each respectively having one of the biased compression members or pins 208a to 208s. The top wall in this embodiment may be an additional board or may actually be one of the wooden boards of the existing trough. In either situation, the board 200 is formed with suitable apertures (or suitable apertures are formed in the board) for the compression members 208a to 208s to extend through. This embodiment can thus work with the existing boards in the trough. It should be appreciated that this embodiment may also require reconfiguration of the plates underlying or supporting the wooden boards in the trough.

Figure 15:
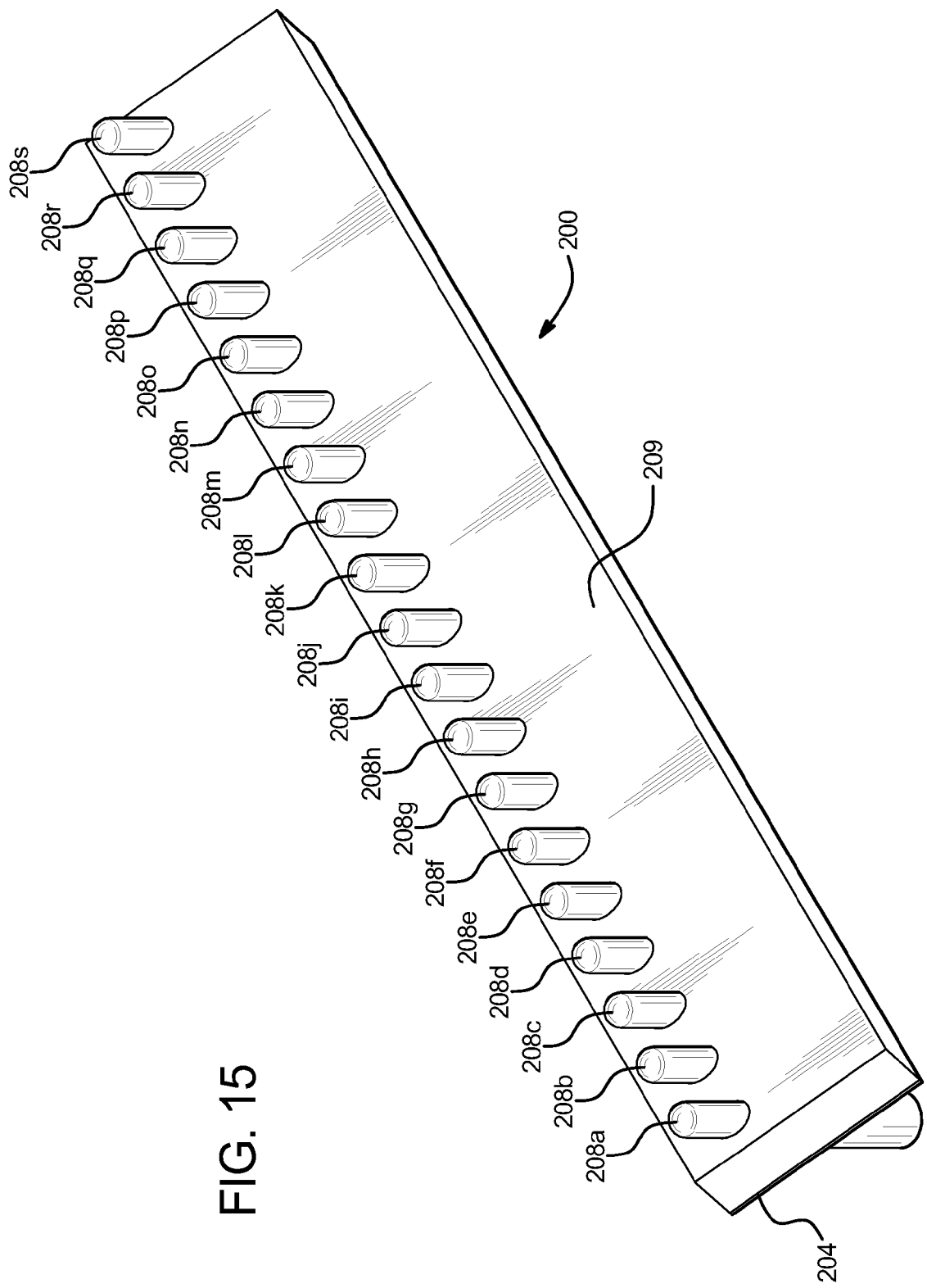
FIG. 15 is a top perspective view of a coil restraint of a coil restraint system of another embodiment of the present disclosure, and illustrating the compression members all in extended or non-compressed positions.
Figure 16:
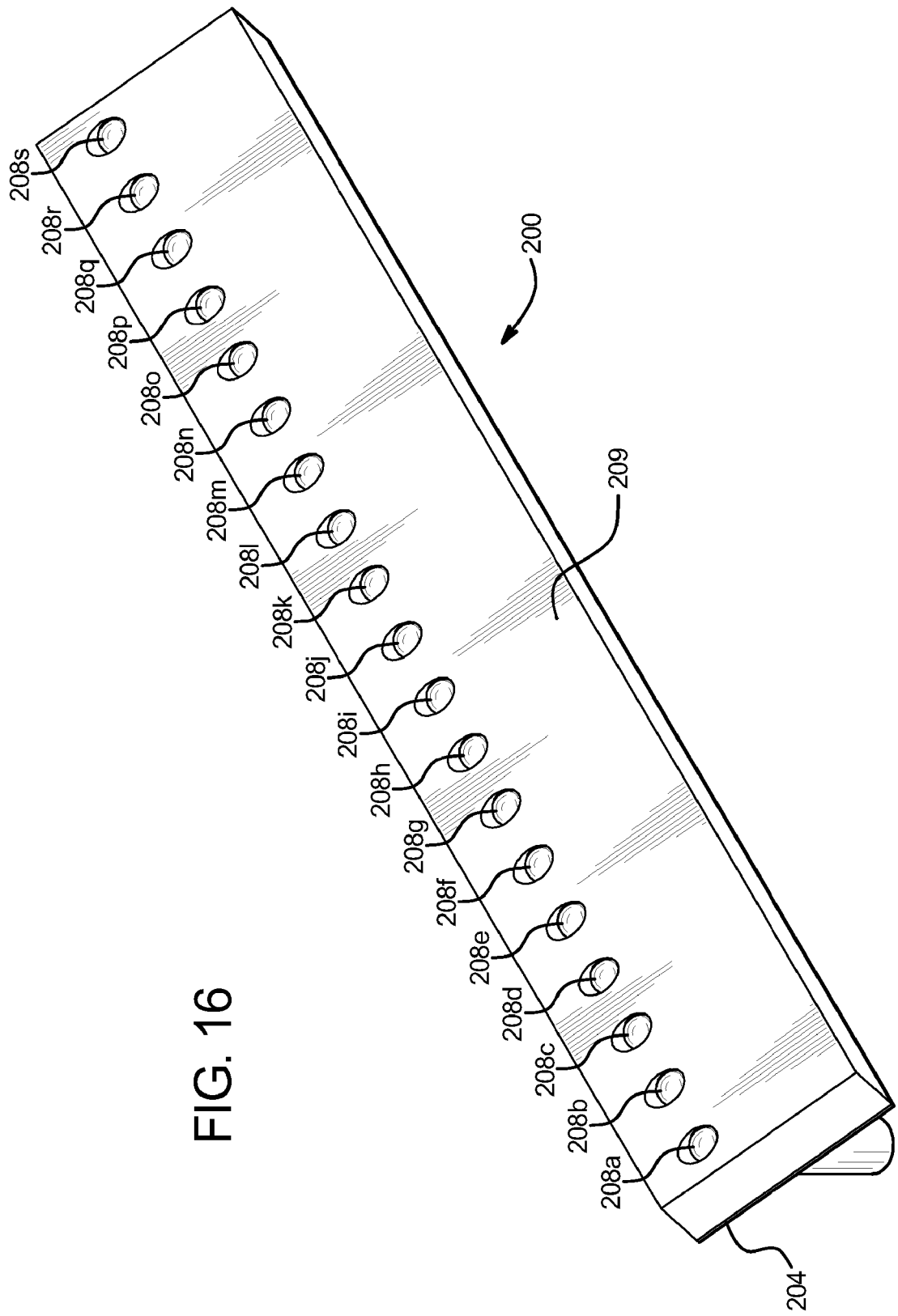
FIG. 16 is a top perspective view of the coil restraint of FIG. 15, and illustrating the compression members all in retracted or compressed positions.
Figure 17:
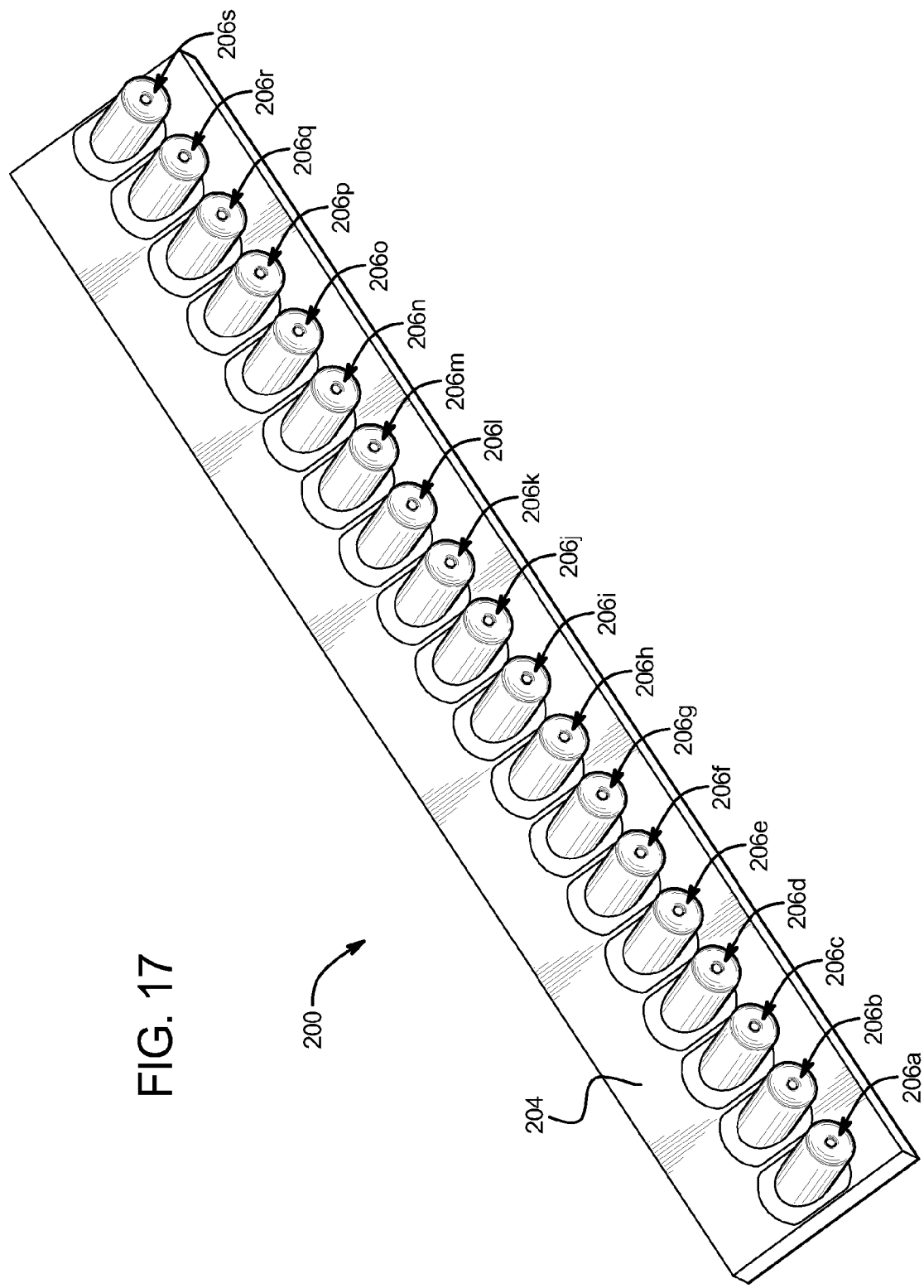
FIG. 17 is a fragmentary bottom perspective view of the coil restraint of FIG. 15, and illustrating the bottom side of individual compression assemblies.
Figure 18:
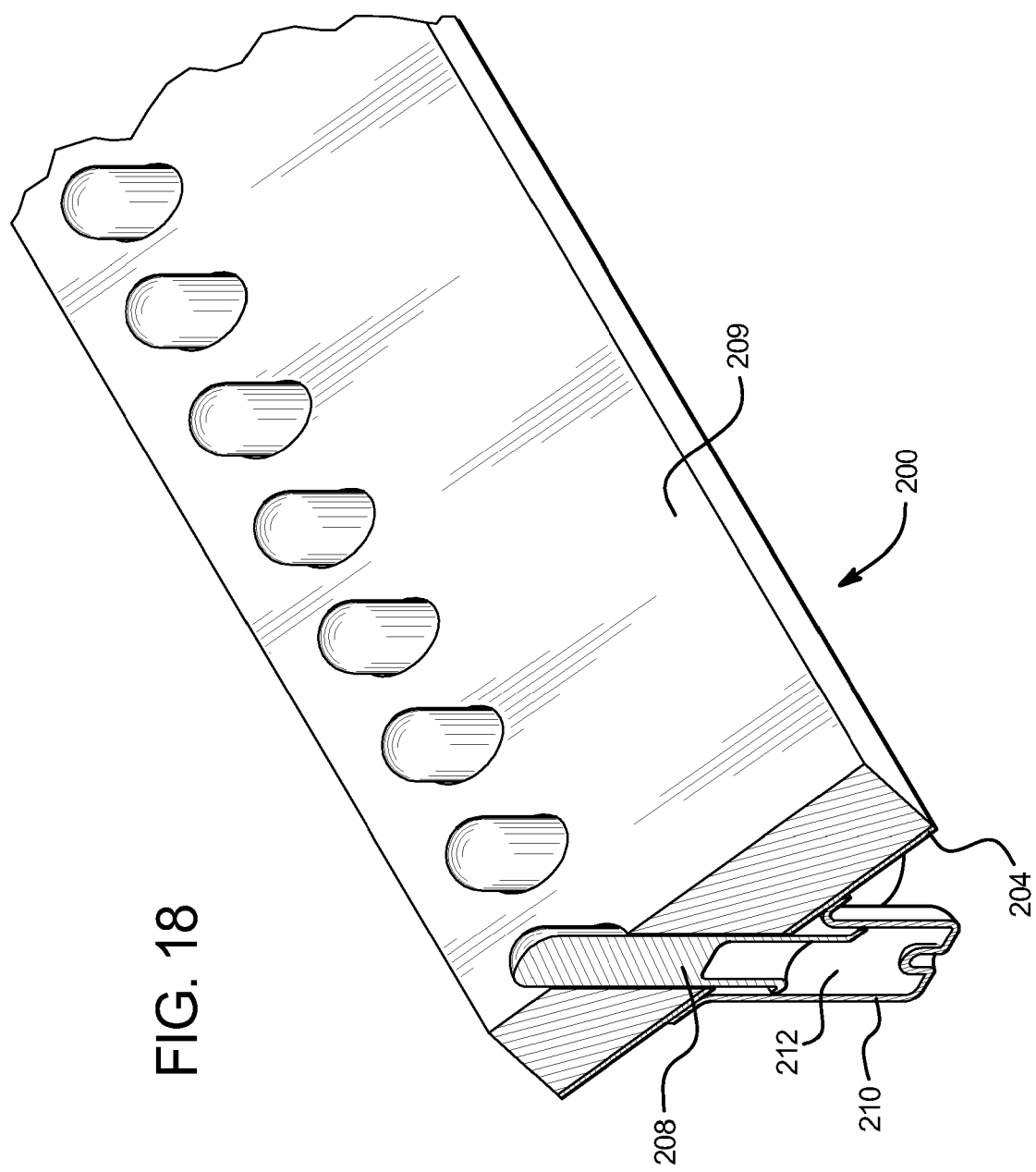
FIG. 18 is a fragmentary top perspective and cross-sectional view of the coil restraint of FIG. 15, and illustrating one configuration of one compression assembly including a compression member and a compression member pocket or compartment with the spring removed.
Figure 19:
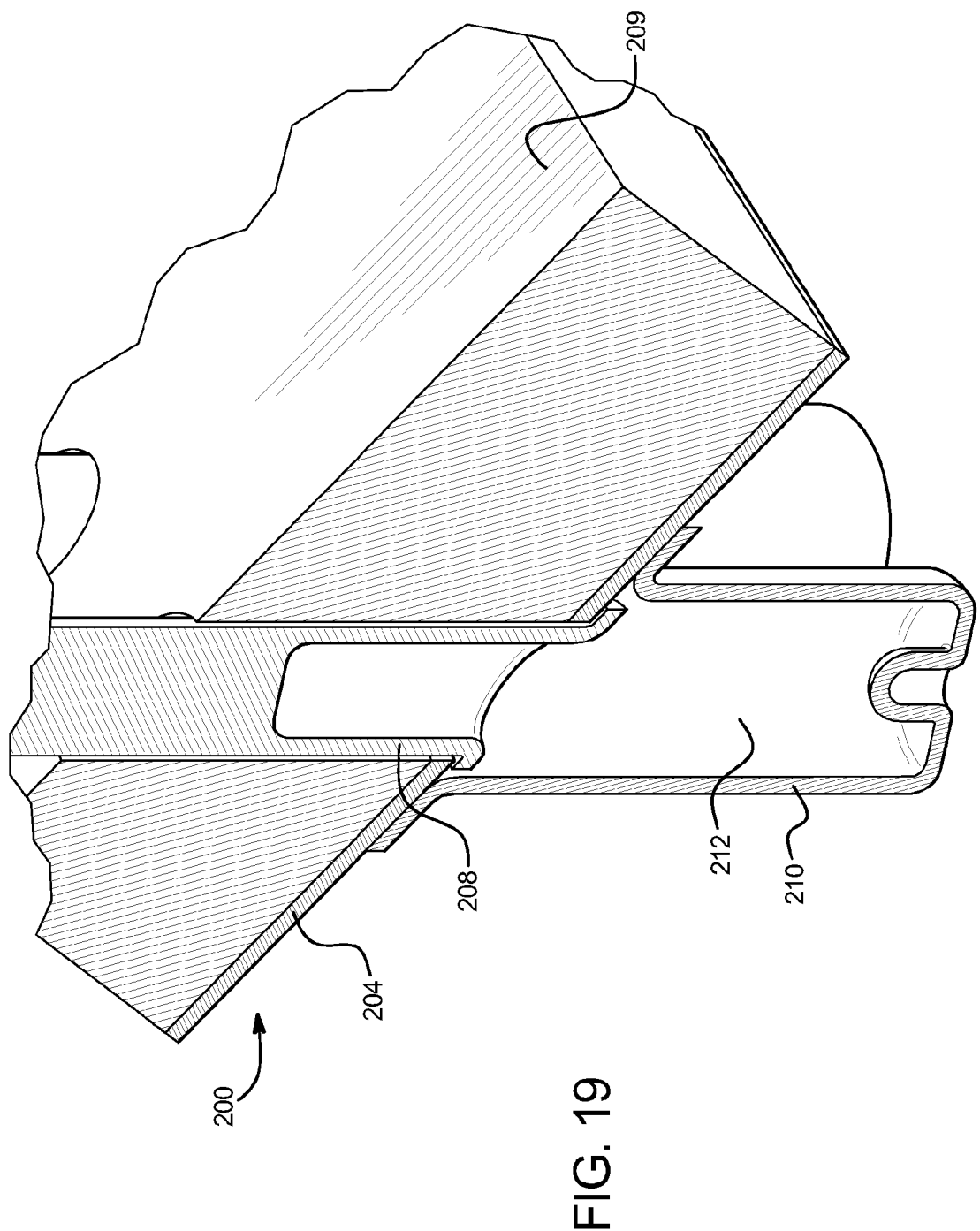
FIG. 19 is an enlarged fragmentary top perspective view of the coil restraint of FIG. 15, and illustrating one configuration of one compression assembly including a compression member in an extended position in a compression member compartment or pocket with the spring removed.
Figure 20:
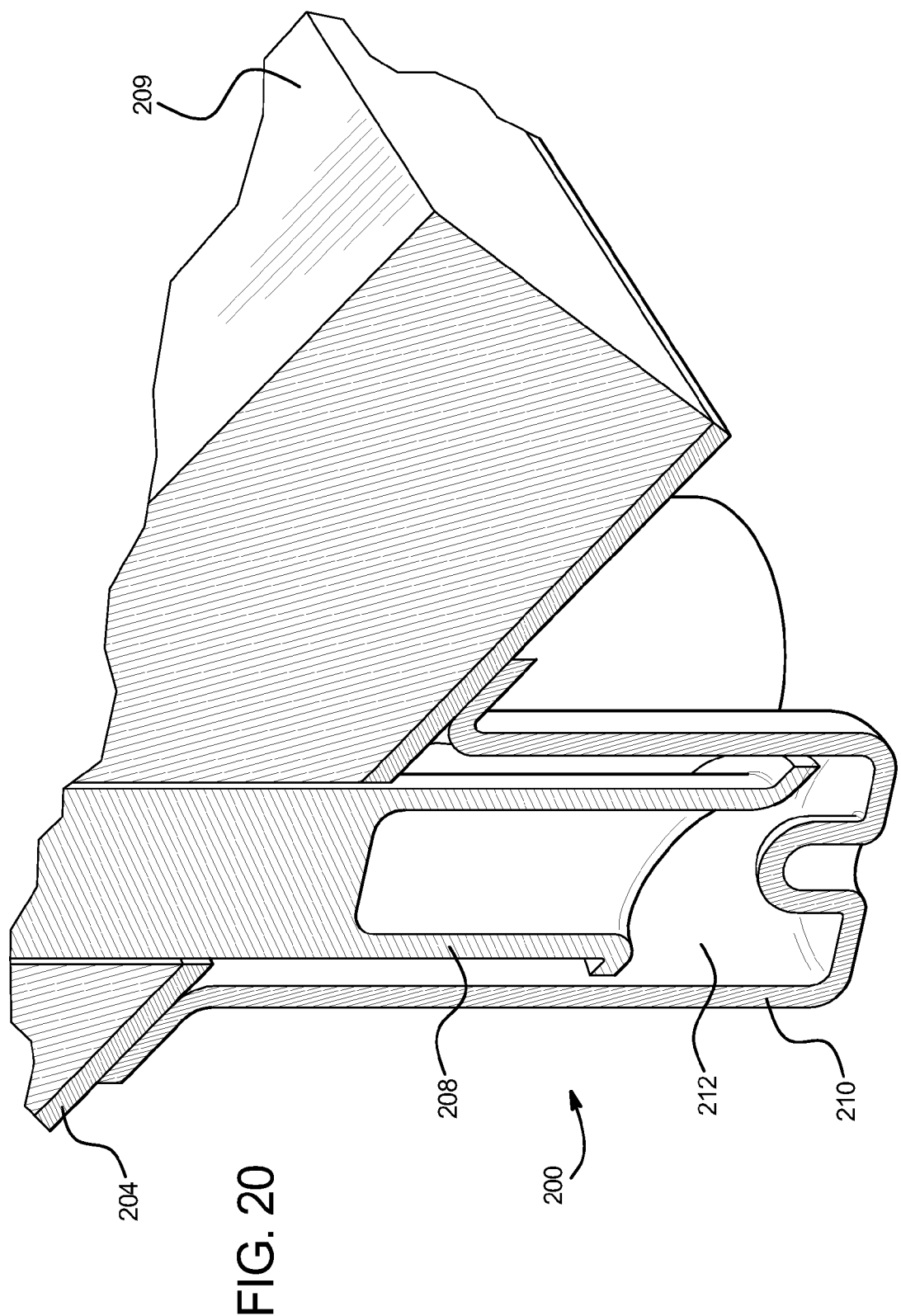
FIG. 20 is an enlarged fragmentary top perspective view of the coil restraint of FIG. 15, and illustrating one configuration of one compression assembly including a compression member in a non-extended position in a compression member compartment or pocket with the spring removed.

More specifically, as best illustrated in FIGS. 17, 18, 19, and 20, each compression assembly includes a compression base 210 suitably attached to the bottom wall 204 and which defines a compression pocket 212, a compression member such as a compression pin 208, and a biasing member such as a suitable spring (not shown) positioned in the compression pocket 212 between the compression base 210 and a bottom section of the compression member 208. The compression spring is positioned to bias the compression member 208 toward the extended or non-compressed position as shown in FIGS. 15 and 19. Each compression member or pin extends through one of the apertures of the top wall or wooden board 202. In the illustrated embodiment, the bottom wall 204 and the compression member or pin 208 are configured to maintain the compression member or pin 208 in the compression compartment or pocket 212. When a coil such as a steel coil engages the compression member or pin, the compression member or pin moves against the bias of the spring or other biasing member into the pocket as generally shown in FIGS. 16 and 20.

In various embodiments, to form the coil restraint system, a plurality of coil restraints 200 are mounted in a trough of a transverse coil car. In one embodiment, the coil restraints 200 are mounted horizontally or transversely along the boards of the trough. The coil restraints 200 are spaced apart at suitable distances. The coil restraints 200 are spaced apart approximately every 6 inches in one embodiment of the coil restraint system. The coil restraints 200 are offset from each other in one embodiment to provide maximum coverage of the trough. It should be appreciated that the coil restraints 200 may be placed at any suitable distances from each other and in any suitable positions. All of the compression members or pins of the coil restraints will be in extended or non-compressed positioned when no coil is positioned in the trough. When a coil is positioned in the trough, the coil will compress many of the compression member or pins of each of the coil restraints and not compress certain of the compression member or pins of coil restraints. The non-compressed compression members or pins directly adjacent to the respective sides of the coil prevent the transverse movement of the coil in the trough.

It should be appreciated that for different coils such as different size and different shape steel coils will compress different compression members or pins of the coil restraints and the compression members or pins of the coil restraints that are not compressed and adjacent to the sides of the steel coil will be the compression members or pins that prevent sideways shifting of the steel coils. It should also be appreciated that for steel coils placed in different locations in the trough, the steel coils will compress different compression members or pins of the coil restraints and the compression members or pins that are not compressed and adjacent to the sides of the steel coil will be the compression members or pins that prevent sideways shifting of the steel coils. It should thus be appreciated that the coil restraint system of the embodiment illustrated in FIGS. 15 to 20 are configured to engage the sides of different size and differently positioned coils in the trough of transverse coil car to prevent the transverse shifting of coils.

Figure 21:
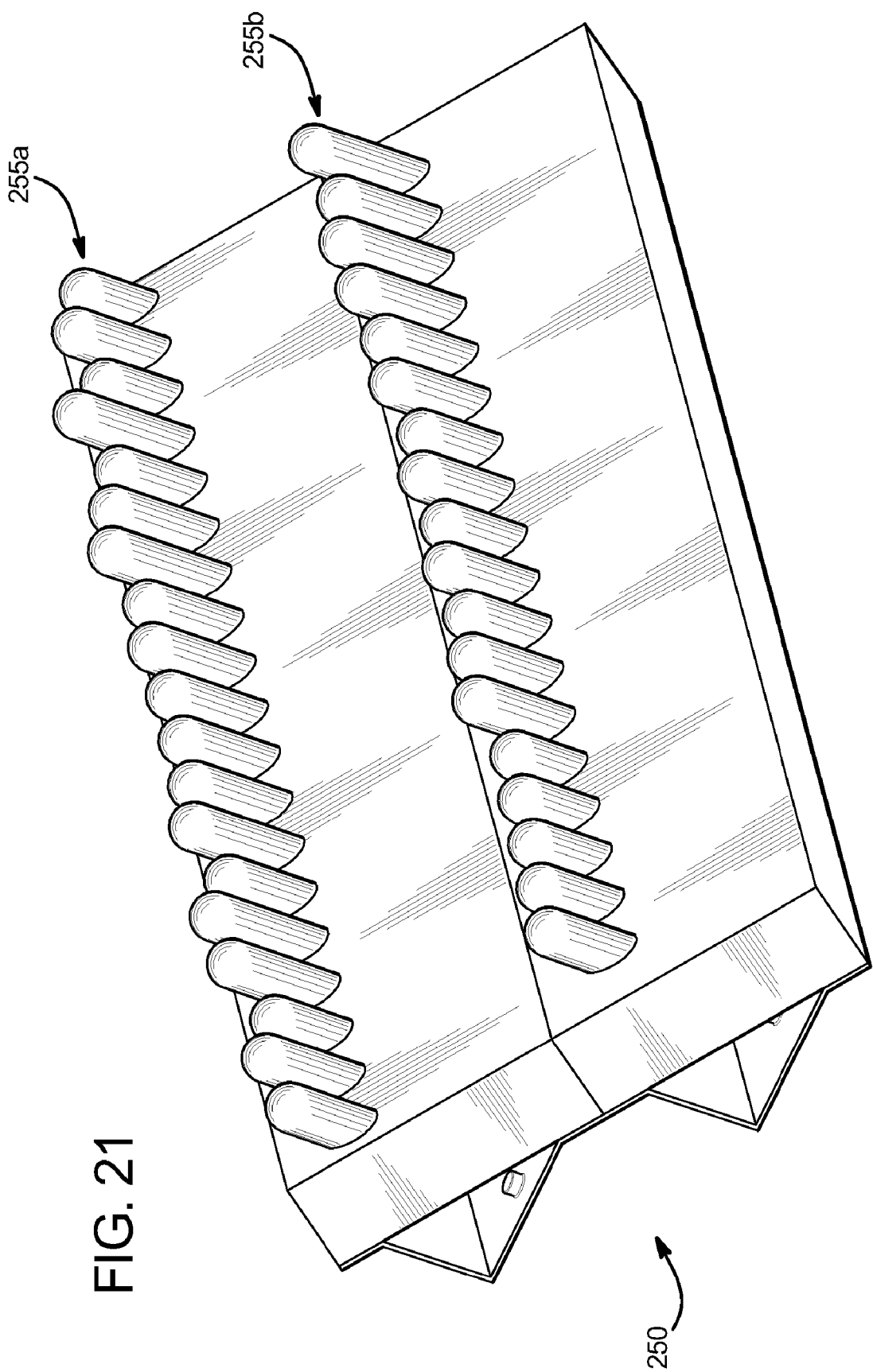
FIG. 21 is a top perspective view of a coil restraint of a coil restraint system of another embodiment of the present disclosure, and illustrating multiple rows of compression members, some of which are in extended or non-compressed positions and some of which are in partially non-extended or compressed positions.

FIG. 21 illustrates another alternative embodiment of the coil restraint of the coil restraint system of the present disclosure, and which is generally indicated by numeral 250. This coil restraint 250 is similar to the coil restraint 200, but includes two rows 255a and 255b each having a plurality of compression assemblies each respectively having a biased compression member or pin. Thus, it should be appreciated that the positioning and spacing of the compression members or pins may vary. This embodiment also illustrates that the compression members or pins may be independently depressed (since some of the compression members are shown fully extended and some are shown partially depressed). It should also be appreciated that in this embodiment each spring (not shown) in mounted on a boss and may not be positioned in a separate chamber. It should also be appreciated that this embodiment shows that the bottom wall can be alternatively configured in accordance with the present disclosure. It should also be appreciated that the compression members or pins may be any suitable sizes and particularly any suitable heights. In certain embodiments, the compression members or pins are any where from approximately 2 inches to approximately 5 inches. The compression members or pins may also be of any suitable diameter and may be other suitable slopes.

Figure 22:
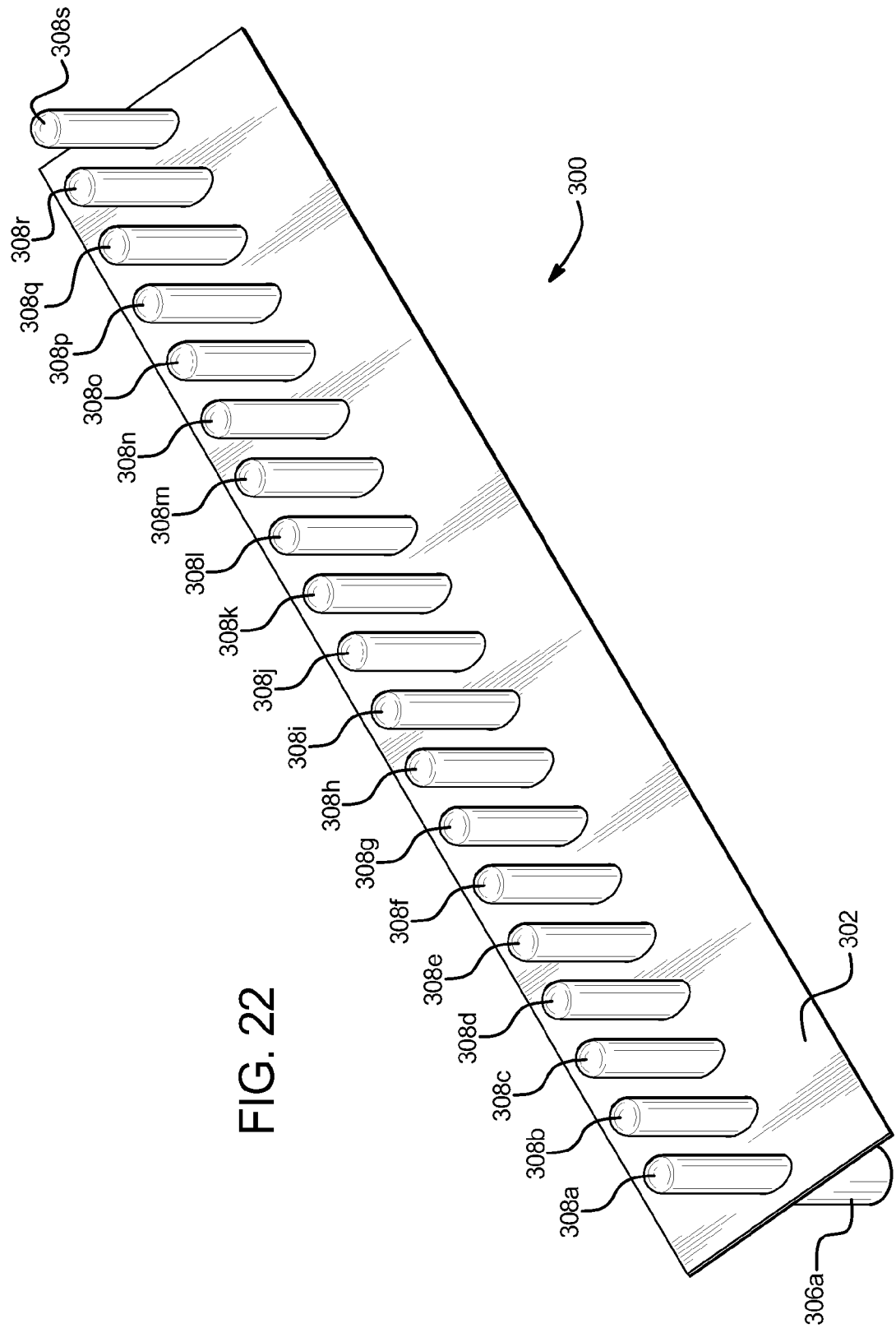
FIG. 22 is a top perspective view of a coil restraint of a coil restraint system of another configuration of the present disclosure, and illustrating compression members all in extended or non-compressed positions.
Figure 23:
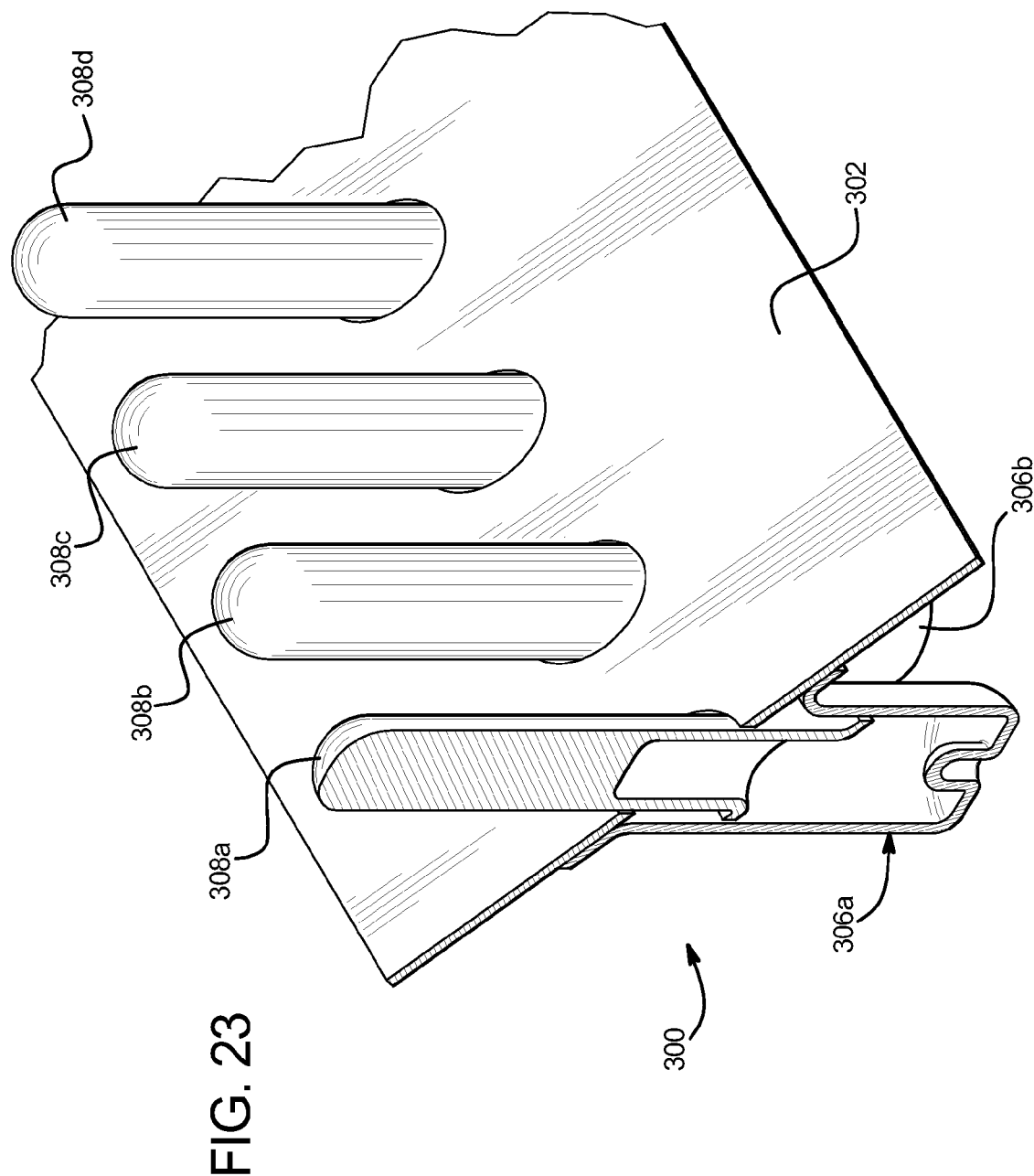
FIG. 23 is an enlarged fragmentary top perspective view of the coil restraint of FIG. 22, and illustrating a configuration of one compression assembly including a compression member, and a compression member compartment or pocket a partially compressed compression member and with the spring removed.

FIGS. 22 to 23 illustrate an alternative configuration of the coil restraint of the coil restraint system of the present disclosure, and which is generally indicated by numeral 300. This coil restraint is similar to the coil restraint 200, and includes the plurality of compression assemblies 306a to 306s (not all shown) each directly attached to the bottom wall 302 which defines a plurality of spaced-apart apertures. The compression assemblies each respectively have one of the biased compression members or pins 308a to 308s. This embodiment does not include a top wall even though it could be used to be mounted in the boards which can act as a top wall if desired by the installer. It should thus be appreciated that the embodiments illustrated in FIGS. 15 to 23 are configured to be at least partially mounted in the boards of the troughs. It should also be appreciated that other suitable configurations are within the scope of the present disclosure.

It should be appreciated that the coil restraints 200, 250, and 300 and each of the components thereof may be made of any suitable strong material such as a suitable metal, plastic, ceramic or composite material and assembled in any suitable manner.

It should further be appreciated that: (a) the number of compression members, (b) the size of one or more of the compression members, (c) the shape of one or more of the compression members, (d) the angles at which one or more of the compression members extend, and (e) the material of one or more of the compression members may vary in accordance with the present disclosure. It should also be appreciated that the shape, configuration, size, angles, quantities, and materials of the bottom and top walls may also vary in accordance with the compression members and the present disclosure.

It should also be appreciated that after being installed, the coil restraints work automatically without the need for a person to go into the trough during the loading process or when the coil is in the trough. This avoids injury to the loaders. It should also be appreciated that after installed, the coil restraints do not need to be changed after each steel coil is removed from the trough. This avoids the need for blocking (as described above) and unwanted dunnage (as described above). It should also be appreciated that after installed, the coil restraints work even when the steel coils are wrapped in or covered by heavy material such as cardboard sheeting.

Figure 24:
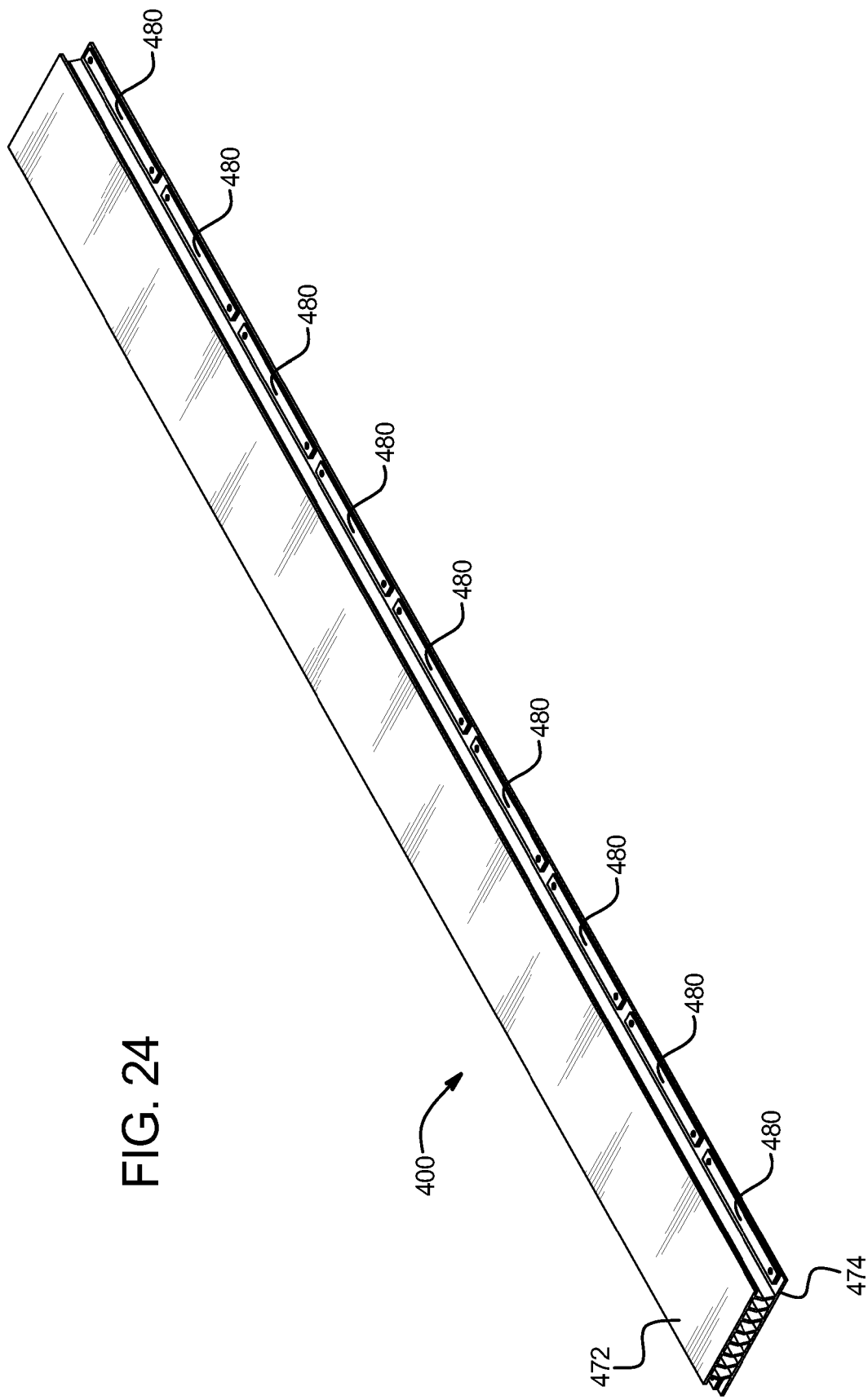
FIG. 24 is a perspective view of a coil restraint of a coil restraint system of another embodiment the present disclosure.
Figure 25:
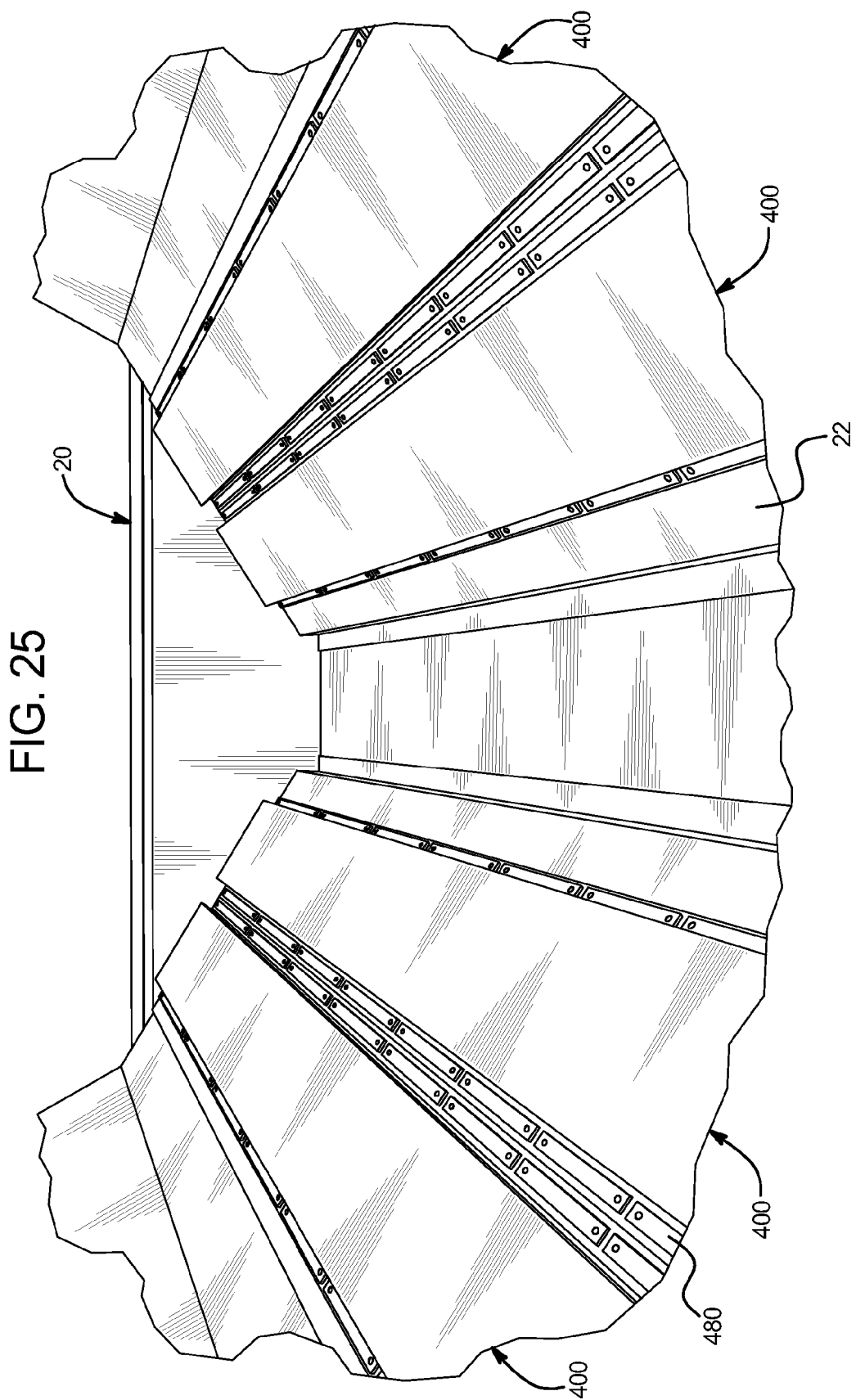
FIG. 25 is a perspective view of a plurality of the coil restraints of FIG. 24 positioned in a trough of a transverse railroad car prior to a coil being positioned in the trough.
Figure 26:
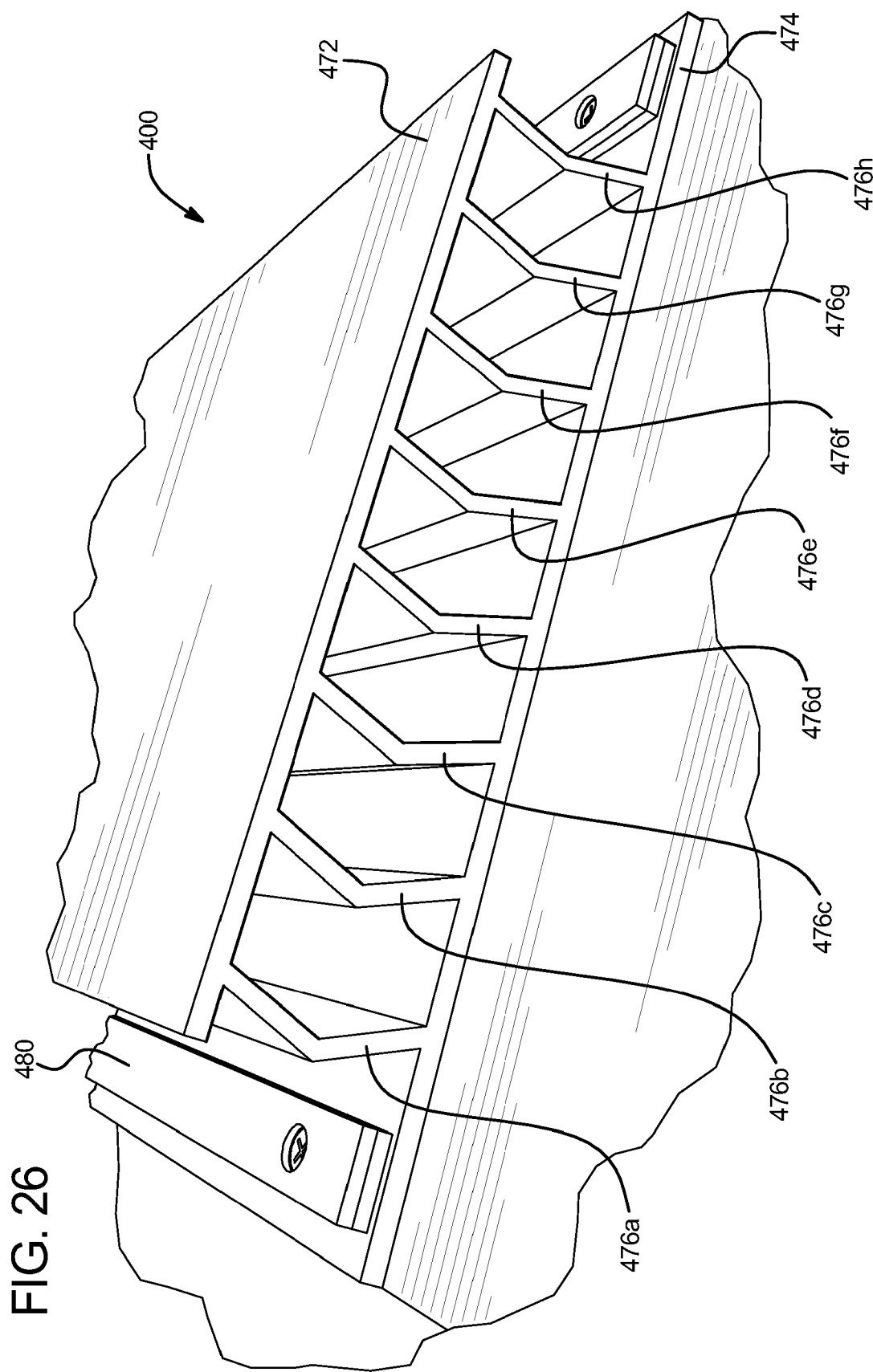
FIG. 26 is an enlarged fragmentary perspective view of a coil restraint of the coil restraint system of FIG. 24, illustrating the retaining or securing members.

FIGS. 24 to 26 illustrate an alternative configuration of the coil restraint of the coil restraint system of the present disclosure, and which is generally indicated by numeral 400. This configuration is a further widened or elongated version of the coil restraint 180 of FIG. 14. More specifically, the coil restraint 400 includes an elongated continuous top wall 472, an elongated continuous bottom wall 474, and a plurality of spaced apart independently flexible or crushable compression members or walls 476a to 476h integrally attached to and extending respectively between the top wall 472 and the bottom wall 474. In this illustrated embodiment, the bottom wall 474 is longer than the top wall 472 to facilitate attachment of the coil restraint to the trough. This embodiment is approximately ten inches long and approximately one hundred eight inches wide which enables this coil restraint to be easily extruded. This coil restraint 400 is extruded with each of the top and bottom walls as a single or continuous wall and with the compression members extending between the top wall to the bottom wall. It should be appreciated that one or more interruptions or cuts can be made in the top or bottom wall as generally described herein.

FIGS. 25 and 26 generally shows one mounting configuration for a plurality of coil restraints 400 mounted in a trough 22 of a transverse coil car 20 and how each of the coil restraints which are part of a coil restraint system work together to secure a coil in a trough. The coil restraints 400 of the coil restraint system are mounted along the length (from front to back) of the trough. Each coil restraint 400 extends the entire or substantially the entire transverse width of the trough 22. In this illustrated embodiment, two coil restraints are mounted to each of the front and back walls of the trough (or the wooden boards of the trough). The bottom walls of the coil restraints are mounted adjacent to each other in this illustrated configuration, although it should be appreciated that they may be spaced apart from each other. FIGS. 24, 25, and 26 also illustrate retainers or retainer bars 480 which are used to attach the coil restraints to the front and back walls (or wooden boards) of the trough. Suitable fasteners are used to attach each retainer or retainer bar to the coil restraint and to the boards of the trough. It should be appreciated that other suitable retainers and fasteners may be employed. It should also be appreciated that the coil restraints may be spaced differently than shown on each or both of the front and back walls.

FIGS. 25 and 26 show all of the coil restraints in extended or non-compressed positions because no coil is positioned in the trough 22. When a coil is positioned in the trough 22, depending on the size of the coil one or both of the coil restraints of the coil restraint system on each of the front and back walls of the trough will be compressed by the coil. Certain portions of each of the coil restraints on either side of the coil will not be compressed. When the coil is in the trough 22, the non-compressed portions of the coil restraints directly adjacent to the respective sides of the coil are configured to engage the sides of the coil to prevent the sideways shifting of the coil in the trough. More specifically, in this embodiment, the heavy coil would compress part of the top wall and the compression members under that part of the top wall. On both sides of the coil, the non-compressed portions of the top wall and non-compressed compression members there under would co-act to engage the respective sides of the coil to prevent sideways movement of the coil.

As in the above embodiments, it should be appreciated that for coils of different sizes (and practically different widths), the different size coils will compress different portions of the coil restraints and the portions of the coil restraints that are not compressed and adjacent to the sides of the coil will be the portions of the coil restraints that prevent sideways shifting of the coils. For example, depending on the shape of the trough, a coil having a relatively small diameter may only engage the lower coil restraints on each wall in the trough, a coil having a relatively intermediate diameter may engage the lower and upper coil restraints on each wall in the trough, and a coil having a relatively large diameter may only engage the upper coil restraints on each wall in the trough. It should also be appreciated that for coils placed in different locations in the trough, the coils will compress different portions of the coil restraints of the coil restraint system, and the portions of the coil restraints that are not compressed and adjacent to the sides of the coil will be the portions of the coil restraints that prevent sideways shifting of the coils. It should thus be appreciated that the coil restraint system of the embodiment illustrated in FIGS. 24, 25 and 26 is configured to engage the sides of different size and differently positioned coils in the troughs of transverse coil cars to prevent the sideways shifting of the coils.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A railroad car coil restraint system for a transverse railroad coil car having a trough, said trough including a front wall and a back wall and configured to hold a coil, said railroad car coil restraint system comprising:
   a plurality of coil restraints, each coil restraint having:
   (a) a bottom wall configured to be attached to one of the front and back walls of the trough,
   (b) a top wall, and (c) a plurality of elongated spaced-apart independently flexible compression members directly attached to and extending between the bottom wall and the top wall, said coil restraints configured to be mounted in the trough such that:

(i) when the coil is positioned in said trough, the coil compresses certain portions of said coil restraints and does not compress other portions of said coil restraints, and (ii) certain of said other portions of the coil restraints are configured to prevent sideways shifting of the coil by engaging sides of the coil.

2. The railroad car coil restraint system of claim 1, wherein the coil restraints are each made of a rubber.

3. The railroad car coil restraint system of claim 1, wherein the coil restraints are each made of an extruded rubber.

4. The railroad car coil restraint system of claim 1, wherein the coil restraints are configured to be mounted substantially across an entire length of said trough.

5. The railroad car coil restraint system of claim 1, wherein two of the coil restraints are configured to be mounted on the front wall of said trough and two of the coil restraints are configured to be mounted on the back wall of said trough.

6. The railroad car coil restraint system of claim 5, wherein the coil restraints are configured to be mounted on each of the front wall and the back wall in spaced apart relation to each other.

7. The railroad car coil restraint system of claim 5, where said coil restraints are configured to be mounted on each of the front wall of said trough and the back wall of said trough directly adjacent to each other.

8. The railroad car coil restraint system of claim 1, which includes a plurality of retainers configured to facilitate attachment of the coil restraints to the front wall and the back wall of said trough.

9. The railroad car coil restraint system of claim 1, wherein the top wall of each coil restraint is continuous.

10. The railroad car coil restraint system of claim 1, wherein the bottom wall of each coil restraint is continuous.

11. The railroad car coil restraint system of claim 1, wherein for each coil restraint, the bottom wall of said coil restraint is longer than the top wall of said coil restraint.

12. A railroad car coil restraint system for a transverse railroad coil car having a trough, said trough including a front wall and a back wall and configured to hold a coil, said railroad car coil restraint system comprising:

a plurality of coil restraints, each coil restraint having:

(a) a bottom wall configured to be attached to one of the front and back walls of the trough, (b) a top wall, and (c) a plurality of elongated spaced-apart independently flexible compression members directly attached to and extending between the bottom wall and the top wall, said coil restraints configured to be mounted in the trough such that:

(i) when the coil is positioned in said trough, the coil compresses certain portions of the compression members of said coil restraints and does not compress other portions of said compression members of said coil restraints, and (ii) certain of said other portions of the coil restraints are configured to prevent sideways shifting of the coil by engaging sides of the coil.

13. The railroad car coil restraint system of claim 12, wherein the coil restraints are each made of a rubber.

14. The railroad car coil restraint system of claim 12, wherein the coil restraints are each made of an extruded rubber.

15. The railroad car coil restraint system of claim 12, wherein the coil restraints are configured to be mounted substantially across an entire length of said trough.

16. The railroad car coil restraint system of claim 12, wherein two of the coil restraints are configured to be mounted on the front wall of said trough and two of the coil restraints are configured to be mounted on the back wall of said trough.

17. The railroad car coil restraint system of claim 16, wherein the coil restraints are configured to be mounted on each of the front wall and the back wall in spaced apart relation to each other.

18. The railroad car coil restraint system of claim 16, where said coil restraints are configured to be mounted on each of the front wall of said trough and the back wall of said trough directly adjacent to each other.

19. The railroad car coil restraint system of claim 12, which includes a plurality of retainers configured to facilitate attachment of the coil restraints to the front wall and the back wall of said trough.

20. The railroad car coil restraint system of claim 12, wherein the top wall of each coil restraint is continuous.

21. The railroad car coil restraint system of claim 12, wherein the bottom wall of each coil restraint is continuous.

22. The railroad car coil restraint system of claim 12, wherein for each coil restraint, the bottom wall of said coil restraint is longer than the top wall of said coil restraint.

* * * * *